US008466981B2

(12) United States Patent
Okamoto

(10) Patent No.: US 8,466,981 B2
(45) Date of Patent: Jun. 18, 2013

(54) ELECTRONIC CAMERA FOR SEARCHING A SPECIFIC OBJECT IMAGE

(75) Inventor: Masayoshi Okamoto, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 225 days.

(21) Appl. No.: 13/043,108

(22) Filed: Mar. 8, 2011

(65) Prior Publication Data

US 2011/0221921 A1 Sep. 15, 2011

(30) Foreign Application Priority Data

Mar. 12, 2010 (JP) .................................. 2010-055213

(51) Int. Cl.
*H04N 5/228* (2006.01)
(52) U.S. Cl.
USPC .................................. 348/222.1; 348/208.14
(58) Field of Classification Search
USPC .................................. 348/208.14, 222.1, 345
See application file for complete search history.

(56) References Cited

U.S. PATENT DOCUMENTS

| 7,769,287 | B2 * | 8/2010 | Sakamoto ..................... 348/348 |
| 8,004,573 | B2 * | 8/2011 | Watanabe ................ 348/211.99 |
| 2007/0274703 | A1 * | 11/2007 | Matsuda ....................... 396/264 |
| 2008/0180542 | A1 | 7/2008 | Kuniyuki et al. |
| 2009/0237521 | A1 * | 9/2009 | Nishijima .................. 348/222.1 |
| 2010/0254689 | A1 * | 10/2010 | Yata ............................... 396/95 |

FOREIGN PATENT DOCUMENTS

| JP | 2008-187412 A | 8/2008 |
| JP | 2010-028606 A | 2/2010 |

* cited by examiner

*Primary Examiner* — Gevell Selby
(74) *Attorney, Agent, or Firm* — Westerman, Hattori, Daniels & Adrian, LLP

(57) ABSTRACT

An electronic camera includes an imager. An imager repeatedly outputs a scene image generated on an imaging surface capturing a scene. A searcher repeatedly executes a process of searching for a specific object image from the scene image outputted from the imager by using a plurality of reference-use specific object images each of which has a posture different from others. A detector detects the number of specific objects existing in the object scene based on a searched result of the searcher. A determiner repeatedly determines based on the searched result of the searcher whether or not all of the specific objects equivalent to the number detected by the detector satisfy a posture condition. A recorder records the scene image outputted from the imager when a determined result of the determiner is updated from a negative result to a positive result.

9 Claims, 25 Drawing Sheets

| FPDC | | |
|---|---|---|
| FACE DIRECTION PATTERN | FACE DIRECTION | REFERENCE IMAGE |
| FP_1 | FRONT |  |
| FP_2 | RIGHT-SIDE PROFILE |  |
| FP_3 | OBLIQUE RIGHT |  |
| FP_4 | OBLIQUE LEFT |  |
| FP_5 | LEFT-SIDE PROFILE |  |

FIG.5

RGST1

| FACE DIRECTION PATTERN | CHECKING DEGREE |
|---|---|
|  |  |

FIG.6

TBLw

| No. | FACE POSITION | FACE SIZE | FACE DIRECTION PATTERN |
|---|---|---|---|
| 1 |  |  |  |
| 2 |  |  |  |
| 3 |  |  |  |
| 4 |  |  |  |
| 5 |  |  |  |
| 6 |  |  |  |
| 7 |  |  |  |
| 8 |  |  |  |

FIG.9

TBL1

| No. | FACE POSITION | FACE SIZE | FACE DIRECTION PATTERN | INITIAL DETECTION TIME | FINAL DETECTION TIME | DELETION FLAG |
|---|---|---|---|---|---|---|
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |

(A)

(B)

(C)

| TBL2 | | |
|---|---|---|
| PERSON | MOVING DIRECTION | MOVING SPEED |
|  |  |  |

(A)

(B)

ELECTRONIC CAMERA FOR SEARCHING A SPECIFIC OBJECT IMAGE

CROSS REFERENCE OF RELATED APPLICATION

The disclosure of Japanese Patent Application No. 2010-55213, which was filed on Mar. 12, 2010, is incorporated herein by reference.

BACKGROUND OF THE INVENTION

1. Field of the Invention

The present invention relates to an electronic camera. More particularly, the present invention relates to an electronic camera which searches for a specific object image from a scene image.

2. Description of the Related Art

According to one example of this type of apparatus, a scene image is repeatedly outputted from an image sensor. A CPU repeatedly determines, prior to a half-depression of a shutter button, whether or not a face image facing an imaging surface is appeared on the scene image outputted from the image sensor. A detection history of the face including a determined result is described in a face-detecting history table by the CPU. When the shutter button is half depressed, the CPU determines a face image position based on the detection history of the face described in the face-detecting history table. An imaging condition such as focus is adjusted by noticing the determined face image position. Thereby, it becomes possible to adjust the imaging condition by noticing the face image.

However, in the above-described camera, in a case where there is a plurality of subjects, it is unclear that the existence of them is recognized. Moreover, in a case where a face of the subject is detected and recorded on a history, photographing is performed irrespective of the face of the subject being turned away thereafter. Thereby, the quality of the recorded scene image may be deteriorated.

SUMMARY OF THE INVENTION

An electronic camera according to the present invention, comprises: an imager which repeatedly outputs a scene image generated on an imaging surface capturing a scene; a searcher which repeatedly executes a process of searching for a specific object image from the scene image outputted from the imager by using a plurality of reference-use specific object images each of which has a posture different from others; a detector which detects the number of specific objects existing in the object scene based on a searched result of the searcher; a determiner which repeatedly determines based on the searched result of the searcher whether or not all of the specific objects equivalent to the number detected by the detector satisfy a posture condition; and a recorder which records the scene image outputted from the imager when a determined result of the determiner is updated from a negative result to a positive result.

According to the present invention, a computer program embodied in a tangible medium, which is executed by a processor of an electronic camera provided with an imager which repeatedly outputs a scene image generated on an imaging surface capturing a scene, comprises: a searching instruction to repeatedly execute a process of searching for a specific object image from the scene image outputted from the imager by using a plurality of reference-use specific object images each of which has a posture different from others; a detecting instruction to detect the number of specific objects existing in the object scene based on a searched result of the searching instruction; a determining instruction to repeatedly determine based on the searched result of the searching instruction whether or not all of the specific objects equivalent to the number detected by the detecting instruction satisfy a posture condition; and a recording instruction to record the scene image outputted from the imager when a determined result of the determining instruction is updated from a negative result to a positive result.

According to the present invention, an imaging control method executed by an electronic camera provided with an imager which outputs a scene image produced on an imaging surface capturing a scene, comprises: a searching step of repeatedly executing a process of searching for a specific object image from the scene image outputted from the imager by using a plurality of reference-use specific object images each of which has a posture different from others; a detecting step of detecting the number of specific objects existing in the object scene based on a searched result of the searching step; a determining step of repeatedly determining based on the searched result of the searching step whether or not all of the specific objects equivalent to the number detected by the detecting step satisfy a posture condition; and a recording step of recording the scene image outputted from the imager when a determined result of the determining step is updated from a negative result to a positive result.

The above described features and advantages of the present invention will become more apparent from the following detailed description of the embodiment when taken in conjunction with the accompanying drawings.

BRIEF DESCRIPTION OF THE DRAWINGS

FIG. 5 is an illustrative view showing one example of a register referred to in a checking process;

FIG. 6 is an illustrative view showing one example of a work table referred to in a face detection process;

FIG. 9 is an illustrative view showing one example of a head-count/face direction management table referred to in the face detection process;

DETAILED DESCRIPTION OF THE PREFERRED EMBODIMENTS

Figure 1:
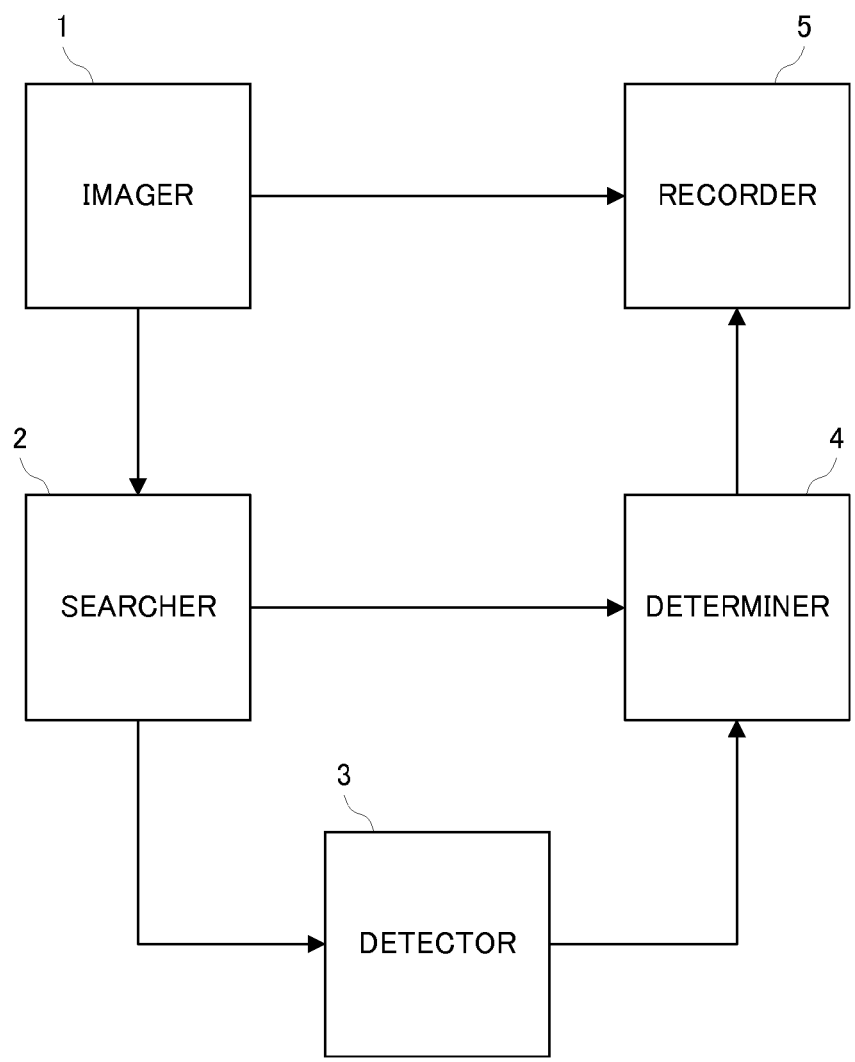
FIG. 1 is a block diagram showing a basic configuration of one embodiment of the present invention.

With reference to FIG. 1, an electronic camera of one embodiment of the present invention is basically configured as follows: An imager 1 repeatedly outputs a scene image generated on an imaging surface capturing a scene. A searcher 2 repeatedly executes a process of searching for a specific object image from the scene image outputted from the imager 1 by using a plurality of reference-use specific object images each of which has a posture different from others. A detector 3 detects the number of specific objects existing in the object scene based on a searched result of the searcher 2. A determiner 4 repeatedly determines based on the searched result of the searcher 2 whether or not all of the specific objects equivalent to the number detected by the detector 3 satisfy a posture condition. A recorder 5 records the scene image outputted from the imager 1 when a determined result of the determiner 4 is updated from a negative result to a positive result.

A searching process is executed by using the plurality of reference-use specific object images each of which has a posture different from others, and therefore, the number and postures of the specific object images are specified for each scene image. Moreover, the searching process is repeatedly executed, and therefore, the number of the specific objects existing in the object scene becomes identified by referring to a plurality of the searched results.

Whether or not all of the specific objects existing in the object scene satisfy the posture condition is repeatedly determined based on the result of the searching process, and a process for recording the scene image is executed when the determined result is updated from the negative result to the positive result.

As a result, the recorded scene image becomes a scene image which is generated in a state where all of the specific objects existing in the object scene satisfy the posture condition. Thereby, it becomes possible to improve the quality of the recorded scene image.

Figure 2:
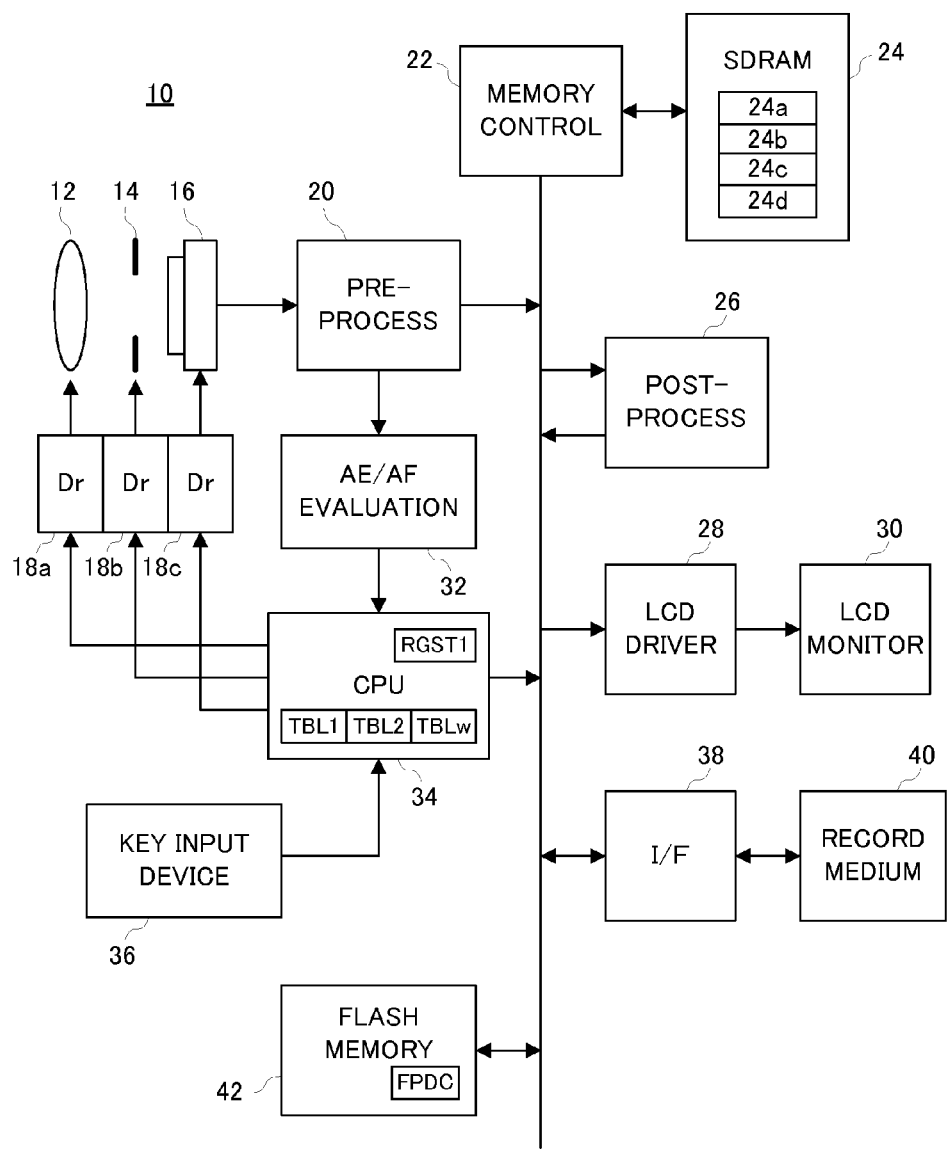
FIG. 2 is a block diagram showing a configuration of one embodiment of the present invention.

With reference to FIG. 2, a digital video camera 10 according to this embodiment includes a focus lens 12 and an aperture unit 14 respectively driven by drivers 18a and 18b. An optical image of the scene that undergoes these components enters, with irradiation, the imaging surface of an image sensor 16, and is subjected to a photoelectric conversion. Thereby, electric charges representing the scene image are produced.

When a power source is applied, under a group photograph shooting task, a CPU 34 commands a driver 18c to repeat an exposure procedure and an electric-charge reading-out procedure in order to start a moving-image taking process. In response to a vertical synchronization signal Vsync periodically generated from an SG (Signal Generator) not shown, the driver 18c exposes the imaging surface and reads out the electric charges produced on the imaging surface in a raster scanning manner. From the image sensor 16, raw image data based on the read-out electric charges is outputted periodically.

A pre-processing circuit 20 performs processes, such as digital clamp, pixel defect correction, and gain control, on the raw image data which is outputted from the image sensor 16. The raw image data on which these processes are performed is written into a raw image area 24a of an SDRAM 24 through a memory control circuit 22.

A post-processing circuit 26 reads out the raw image data accommodated in the raw image area 24a through the memory control circuit 22, performs processes such as a color separation process, a white balance adjusting process and a YUV converting process on the read-out raw image data, and individually creates display image data and search image data that comply with a YUV format.

The display image data is written into a display image area 24b of the SDRAM 24 by the memory control circuit 22. The search image data is written into a search image area 24c of the SDRAM 24 by the memory control circuit 22.

An LCD driver 28 repeatedly reads out the display image data accommodated in the display image area 24b through the memory control circuit 22, and drives an LCD monitor 30 based on the read-out image data. As a result, a real-time moving image (through image) of the scene is displayed on a monitor screen. It is noted that a process for the search image data will be described later.

Figure 3:
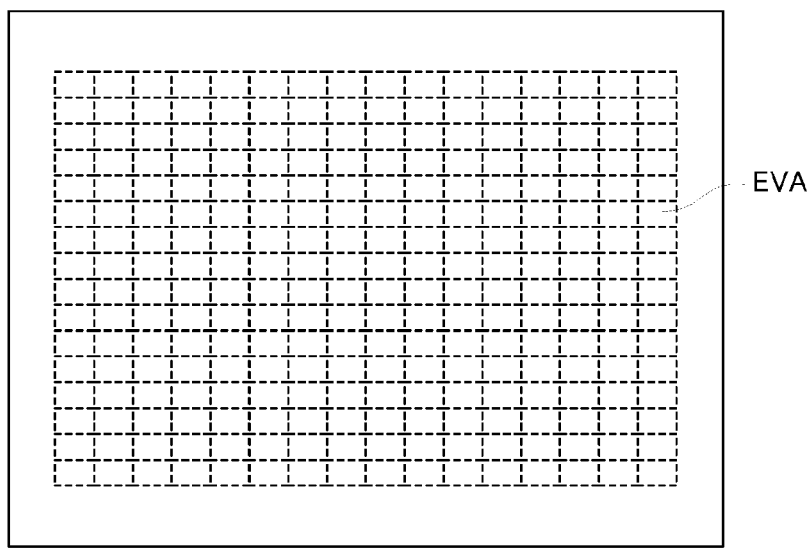
FIG. 3 is an illustrative view showing one example of a state where an evaluation area is allocated to an imaging surface.

With reference to FIG. 3, an evaluation area EVA is allocated to a center of the imaging surface. The evaluation area EVA is divided into 16 portions in each of a horizontal direction and a vertical direction; therefore, 256 divided areas form the evaluation area EVA. Moreover, in addition to the above-described processes, the pre-processing circuit 20 executes a simple RGB converting process which simply converts the raw image data into RGB data.

An AE/AF evaluating circuit 32 integrates RGB data belonging to the evaluation area EVA, out of the RGB data produced by the pre-processing circuit 20, at each generation of the vertical synchronization signal Vsync. Thereby, 256 integral values, i.e., 256 AE evaluation values, are outputted from the AE/AF evaluating circuit 32 in response to the vertical synchronization signal Vsync.

Moreover, an AE/AF evaluating circuit 32 extracts a high-frequency component of G data belonging to the same evaluation area EVA, out of the RGB data outputted from the pre-processing circuit 20, and integrates the extracted high-frequency component at each generation of the vertical synchronization signal Vsync. Thereby, 256 integral values, i.e., 256 AF evaluation values, are outputted from the AE/AF evaluating circuit 32 in response to the vertical synchronization signal Vsync.

In parallel with the moving-image taking process, the CPU 34 executes a simple AE process that is based on the output from the AE/AF evaluating circuit 32 so as to calculate an appropriate EV value. An aperture amount and an exposure time period, which define the calculated appropriate EV value, are respectively set to the drivers 18b and 18c. As a result, a brightness of the through image is adjusted moderately.

When a flag FLG_fr is updated to "1", under the group photograph shooting task, the CPU 34 executes an AE process that is based on the output from the AE/AF evaluating circuit 32 so as to set an aperture amount and an exposure time period which define an optimal EV value calculated thereby to the drivers 18b and 18c. As a result, the brightness of the through image is adjusted strictly. Moreover, under a normal shooting task, the CPU 34 executes an AF process that is based on the output from the AE/AF evaluating circuit 32 so as to set the focus lens 12 to a focal point through the driver 18a. Thereby, a sharpness of the through image is improved.

Subsequently, the CPU 34 executes a still-image taking process and a recording process under the group photograph shooting task. One frame of the display image data immediately after the AF process is completed is taken by the still-image taking process into a still-image area 24d. The taken one frame of the display image data is read out from the still-image area 24d by an I/F 38 which is started up in association with the recording process, and is recorded on a recording medium 40 in a file format.

Figure 7:
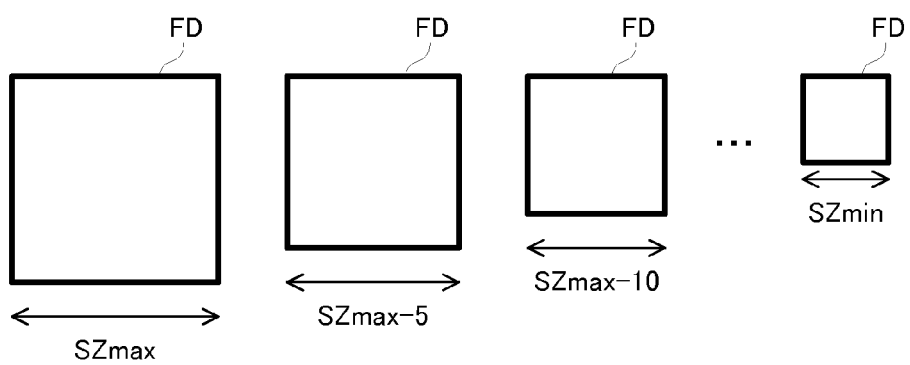
FIG. 7 is an illustrative view showing one example of a face-detection frame structure used for the face detection process.

Moreover, under a head-count/face direction detecting task, the CPU 34 executes a face detection process in order to search for a face image of a person from the image data accommodated in the search image area 24c. For the face detection process, a face direction pattern dictionary FPDC shown in FIG. 4, a register RGST1 shown in FIG. 5, a face-detection work table TBLw shown in FIG. 6, and a plurality of face-detection frame structures FD, FD, FD, . . . shown in FIG. 7 are prepared.

Figure 4:
FIG. 4 is an illustrative view showing one example of a face direction pattern dictionary FPDC which contains face direction patterns.
Figure 4:
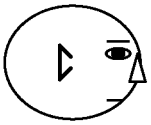
Figure 4:
Figure 4:
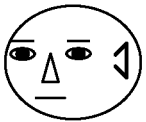
Figure 4:
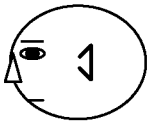

According to FIG. 4, face direction patterns FP_1 to FP_5 for a person are contained in the face direction pattern dictionary FPDC. Herein, FP_1 is corresponding to a posture oriented to a front, FP_2 is corresponding to a posture oriented to just right, FP_3 is corresponding to a posture oriented to obliquely right, FP_4 is corresponding to a posture oriented to obliquely left, and FP_5 is corresponding to a posture oriented to just left.

The register RGST1 shown in FIG. 5 is equivalent to a register for holding a checking degree with reference to the face direction pattern dictionary, and is formed by a column in which a face direction pattern corresponding to the highest checking degree is described and a column in which the checking degree is described.

The face-detection work table TBLw shown in FIG. 6 is equivalent to a table for holding information of a face image detected by a single face-detection process, and is configured by: a column in which a position of the detected face image (position of the face-detection frame structure FD at a time point at which the face image is detected) is described; a column in which a size of the face image (size of the face-detection frame structure FD at a time point at which the face image is detected) is described and a column in which a face direction pattern equivalent to the detected face image is described.

The face-detection frame structure FD shown in FIG. 7 moves in the raster scanning manner on a search area allocated to the search image area 24c, at each generation of the vertical synchronization signal Vsync. The size of the face-detection frame structure FD is reduced by a scale of "5" from a maximum size SZmax to a minimum size SZmin at each time the raster scanning is ended.

Under the head-count/face direction detecting task, firstly, the flag FLG_fr is set to "0". Herein, the flag FLG_fr is a flag for identifying whether or not every detected person faces a front, and "0" indicates at least one detected person not facing the front while "1" indicates every detected person facing the front and being ready for shooting. Subsequently, a head-count/face direction management table TBL1 described later is initialized so as to execute the face detection process.

Figure 8:
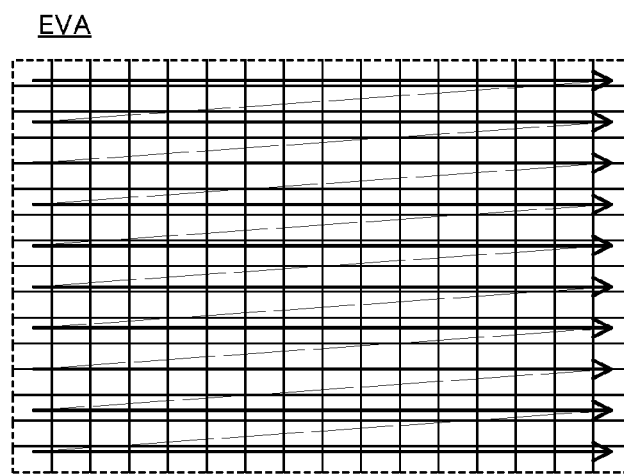
FIG. 8 is an illustrative view showing one example of a searching process.

Firstly, the search area is set so as to cover the whole evaluation area EVA. Moreover, the maximum size SZmax is set to "200", and the minimum size SZmin is set to "20". Therefore, the face-detection frame structure FD, having the size which changes in ranges "200" to "20", is scanned on the evaluation area EVA as shown in FIG. 8.

The CPU 34 reads out the image data belonging to the face-detection frame structure FD from the search image area 24c through the memory control circuit 22 so as to calculate a characteristic amount of the read-out image data. The calculated characteristic amount is checked with each of the characteristic amounts of the face direction patterns FP_1 to FP_5 contained in the face direction pattern dictionary FPDC.

A checking degree with the characteristic amount of the face direction pattern FP_1 exceeds a reference REF when a face of a person facing the front is captured. Moreover, a checking degree with the characteristic amount of the face direction pattern FP_2 exceeds the reference REF when a face of a person oriented to just right is captured. A checking degree with the characteristic amount of the face direction pattern FP_3 exceeds the reference REF when a face of a person oriented to obliquely right is captured. A checking degree with the characteristic amount of the face direction pattern FP_4 exceeds the reference REF when a face of a person oriented to obliquely left is captured. Furthermore, a checking degree with the characteristic amount of the face direction pattern FP_5 exceeds the reference REF when a face of a person oriented to just left is captured.

As a result of checking with each of the face direction patterns FP_1 to FP_5, when the checking degree exceeds the reference REF, the CPU 34 regards the face image of the person as being discovered, and registers the checked face direction pattern and the checking degree on the register RGST1. In a case where a checking degree with another face direction pattern exceeds that registered in the register RGST1, a face direction pattern corresponding to the higher checking degree and the checking degree are overwritten in the register RGST1.

In a case where the face image of the person is discovered from the image data belonging to the face-detection frame structure FD, a position of the face-detection frame structure FD at a current time point, a size of the face-detection frame structure FD at a current time point and the face direction pattern registered in the register RGST1 are described in the face-detection work table TBLw as a record of one person who is discovered.

Subsequently, the face-detection frame structure FD is moved in a raster direction, and similarly to the above process, the characteristic amount of the image data belonging to the face-detection frame structure FD is checked with the characteristic amount of the face direction pattern in the face direction pattern dictionary FPDC so as to update the face-detection work table TBLw when the face image of the person is discovered. These processes are repeatedly performed until the face-detection frame structure FD moves to a lower right position, and thereafter, the CPU reduces the size of the face-detection frame structure FD and searches for the face image of the person again.

When the size of the face-detection frame structure FD reaches SZmin at a time point at which the face-detection frame structure FD moves to the lower right position, the face detection process is ended, and subsequently, an updating/adding process is executed. At this time, records for the number of people discovered by a single face-detection process are held in the face-detection work table TBLw.

Moreover, under the head-count/face direction detecting task, the CPU 34 executes the updating/adding process in order to update the information of the detected face image. For the updating/adding process, the head-count/face direction management table TBL1 shown in FIG. 9 is prepared.

The head-count/face direction management table TBL1 shown in FIG. 9 is equivalent to a table for holding information of the face image detected in a past, and is configured by: a column in which the position of the detected face image is described; a column in which the size of the face image is described; a column in which the face direction pattern equivalent to the detected face image is described; a column in which an initial detection time (the time at which the face detection is performed firstly) is described; a column in which a final detection time (the time at which the face detection is performed finally) is described; and a column in which a deletion flag is described.

Before executing the first updating/adding process, nothing is described in the head-count/face direction management table TBL1. Corresponding to each of the records in the face-detection work table TBLw created in the immediately preceding face detection process, new records for the number of the detected people are created in the head-count/face direction management table TBL1. In columns "face position", "face size" and "face direction pattern", the same contents as the columns having the same names in the face-detection work table TBLw are described. Both in columns "initial detection time" and "final detection time", a current time is described.

In a second-and-subsequent-time updating/adding process, the head-count/face direction management table TBL1 is updated according to the contents of the face-detection work table TBLw created in the immediately preceding face detection process.

Figure 10:
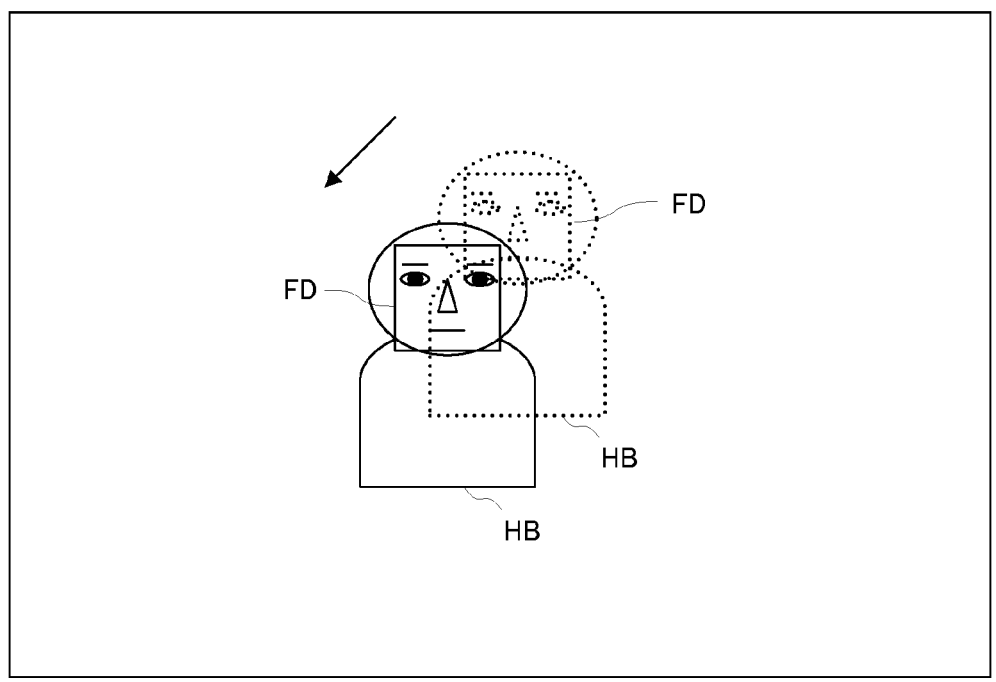
FIG. 10 is an illustrative view showing one portion of an updating/adding process.

Regarding the person described in the face-detection work table TBLw, if there is a record which is determined as the same person in the head-count/face direction management table TBL1, the columns "face position", "face size", and "face direction pattern" of the record are updated with the contents of the face-detection work table TBLw. Moreover, a column "final detection time" is updated to the current time. At a time of determining whether the same person or not, it is determined as the same person if the record of the face position in the face-detection work table TBLw is identical with the record of the face position in the head-count/face direction management table TBL1. Moreover, with reference to FIG. 10, even if the face positions are not completely identical in a case where a person HB moves, etc., it is determined as the same person if the positions of the face-detection frame structures FD are overlapped each other.

In a case where there is no record which is determined as the same person in the head-count/face direction management table TBL1, i.e. in a case where a person newly entered an angle of view exists, a new record is created in the head-count/face direction management table TBL1.

Moreover, under the head-count/face direction detecting task, the CPU 34 executes an undetectable process in order to manage information of a face image once detected but not detected thereafter.

In the undetectable process, the head-count/face direction management table TBL1 is read out by each record, and thereafter, it is determined whether the final detection time is updated by the immediately preceding updating/adding process or in a past.

In a case where the final detection time is updated in the past, i.e., in a case where the face image of the person is once detected but not detected by the immediately preceding face detection process, the column "face direction pattern" of the corresponding record in the head-count/face direction management table TBL1 is updated to "NG". Moreover, regarding a record in which the column "face direction pattern" is already set to "NG" and a given period of time has elapsed since the final detection time remaining the face image, etc. undetected, a column "deletion flag" is set to "1".

Under the head-count/face direction detecting task, the CPU 34 deletes the record in which the column "deletion flag" is "1" out of records in the head-count/face direction management table TBL1. Subsequently, the CPU 34 determines whether or not the column "face direction pattern" of each record in the head-count/face direction management table TBL1 is "FP_1", i.e., whether or not every person detected by the immediately preceding face detection process faces the front. In a case where every person faces the front and a given period of time has elapsed since the initial detection time of them, the flag FLG_fr is set to "1". When the flag FLG_fr is updated to "1" in this way, as described above, the strict AE process, the AF process, the still-image taking process and the recording process are executed so as to record the image data onto the recording medium 40.

Figure 11:
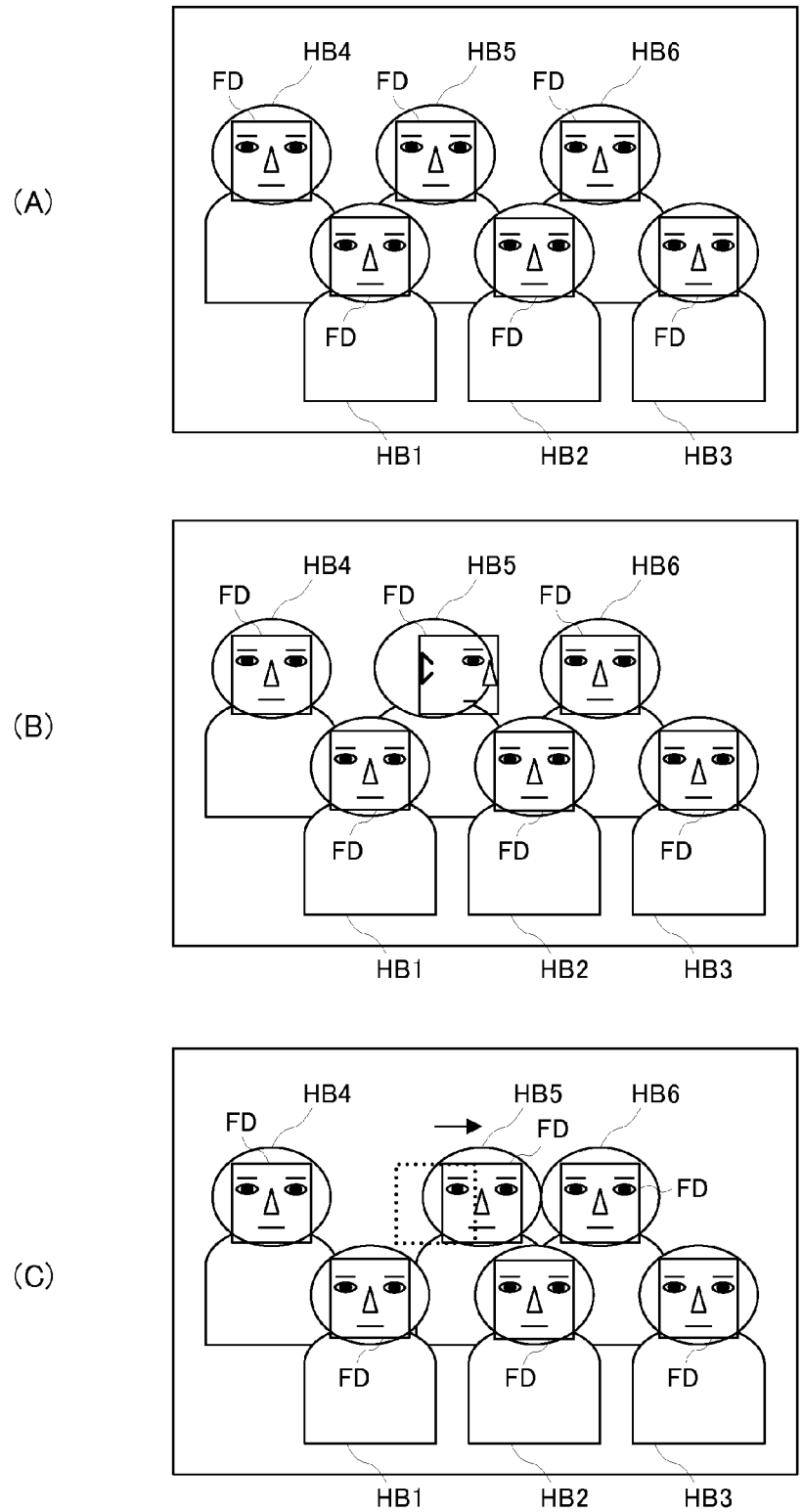
FIG. 11(A) is an illustrative view showing one example of a state where a plurality of people are captured by an imaging surface.
FIG. 11(B) is an illustrative view showing another example of the state where the plurality of people are captured by the imaging surface.
FIG. 11(C) is an illustrative view showing still another example of the state where the plurality of people are captured by the imaging surface.

With reference to FIG. 11(A), FIG. 11(B) and FIG. 11(C), the above-described processes: face detection process; the updating/adding process and the undetectable process will be specifically described as follows. FIG. 11(A) indicates a state of the scene at a time of executing the first face detection process, FIG. 11(B) indicates a state of the scene at a time of executing the second face detection process, and FIG. 11(C) indicates a state of the scene at a time of executing the face detection process again after a given period of time has elapsed since the first face detection process.

In a state of FIG. 11(A), face images of six people HB1 to HB6 are detected. Moreover, every person faces the front but the given period of time has not elapsed since they are detected firstly, and therefore, the flag FLG_fr is not set to "1".

In a state of FIG. 11(B), the face images of the six people HB1 to HB6 are detected similarly to the first detection process but the person HB5 is oriented to just right, and therefore, a column "face direction pattern" of the person HB5 is updated to "FP_2" in the head-count/face direction management table TBL1. Moreover, since every person does not face the front, the flag FLG_fr is not set to "1".

In a state of FIG. 11(C), since positions of the face-detection frame structures FD of people in the middle of the back row are overlapped each other, it is determined as the same person as the person HB5 detected by the first and the second face detection processes. Therefore, a column "final detection time" of the person HB5 is updated in the head-count/face direction management table TBL1. Moreover, because of facing the front, the column "face direction pattern" of the person HB5 is updated to "FP_1". Furthermore, since every person faces the front and the given period of time has elapsed since the initial detection time, the flag FLG_fr is set to "1". Therefore, the strict AE process, the AF process, the still-image taking process and the recording process are executed in the state of FIG. 11(C).

Figure 12:
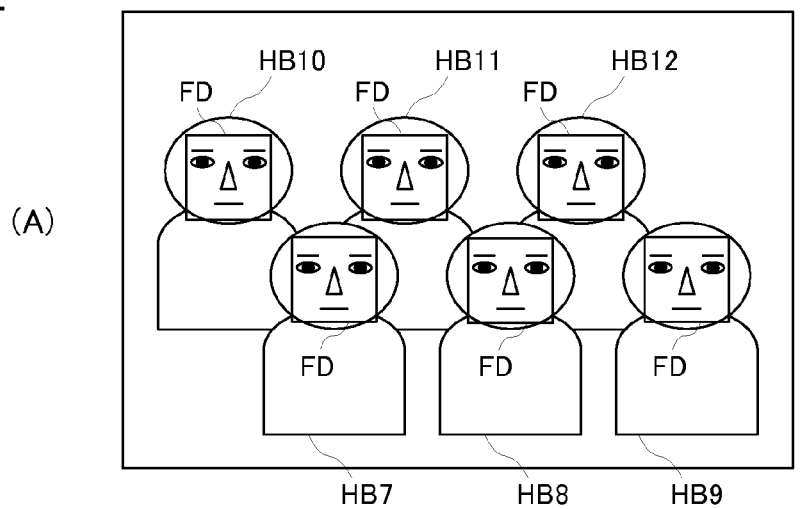
FIG. 12(A) is an illustrative view showing yet another example of the state where the plurality of people are captured by the imaging surface.
FIG. 12(B) is an illustrative view showing another example of the state where the plurality of people are captured by the imaging surface.
FIG. 12(C) is an illustrative view showing still another example of the state where the plurality of people are captured by the imaging surface.
Figure 12:
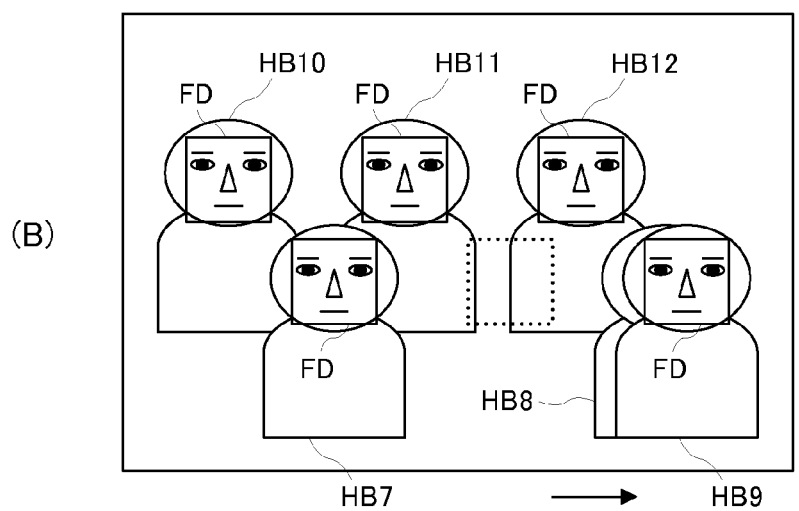
Figure 12:
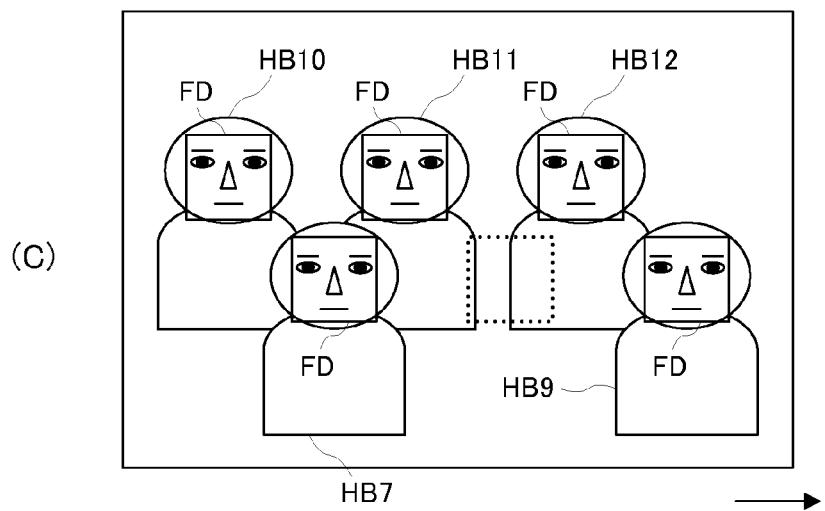

Subsequently, with reference to FIG. 12(A), FIG. 12(B) and FIG. 12(C), an example of a state where the number of the people once detected is reduced while the face detection process is repeatedly executed will be specifically described as follows. FIG. 12(A) indicates a state of the scene at a time of executing the first face detection process, FIG. 12(B) indicates a state of the scene at a time of executing the second face detection process, and FIG. 12(C) indicates a state of the scene at a time of executing the face detection process again after a given period of time has elapsed since the first face detection process.

In a state of FIG. 12(A), face images of six people HB7 to HB12 are detected. Moreover, every person faces the front but a given period of time has not elapsed since they are firstly detected, and therefore, the flag FLG_fr is not set to "1".

In a state of FIG. 12(B), the person HB8 moves, and hides behind the person HB9. Thereby, a face image of the person HB8 is undetected, and a column "face direction pattern" of the person HB8 is updated to "NG" in the head-count/face direction management table TBL1.

In a state of FIG. 12(C), the person HB8 who is undetected last time moves to an outside of the angle of view. Thereby, the face image of the person HB8 is also undetected this time. Moreover, a given period of time has elapsed since the person HB8 was lastly detected, and therefore, a column "deletion flag" of the person HB8 is set to "1" in the head-count/face direction management table TBL1. As a result, a record of the person HB8 is deleted. All of the people HB7 and HB9 to HB12 face the front, and "FP_1" is described in all of columns "face direction pattern" of the people HB7 and HB9 to HB12 in the head-count/face direction management table TBL1. Also, the given period of time has elapsed since the initial detection time, and therefore, the flag FLG_fr is set to "1". Therefore, the strict AE process, the AF process, the still-image taking process and the recording process are executed in the state of FIG. 12(C) in which face images of the five people HB7 and HB9 to HB12 are detected.

The person whose face image is once detected by the face detection process sometimes turns his face to an opposite direction from the digital video camera 10 in order to move, etc. When the face detection process is executed again at this time, the checking degree does not exceed the reference REF with any of the characteristic amounts of the face direction patterns in the face direction pattern dictionary FPDC, and therefore, a face image of the person who changed the direction of the face is undetected. In a case where a given period of time has elapsed in this state, it is necessary to prevent the corresponding record in the head-count/face direction management table TBL1 being deleted irrespective of the person existing in the angle of filed. Then, under the head-count/face direction detecting task, the CPU 34 executes a tracking process in order to comprehend the existence of the person whose face image is undetected in the angle of view. For the tracking process, a tracking information table TBL2 shown in FIG. 13 is prepared.

Figures 13, 14:
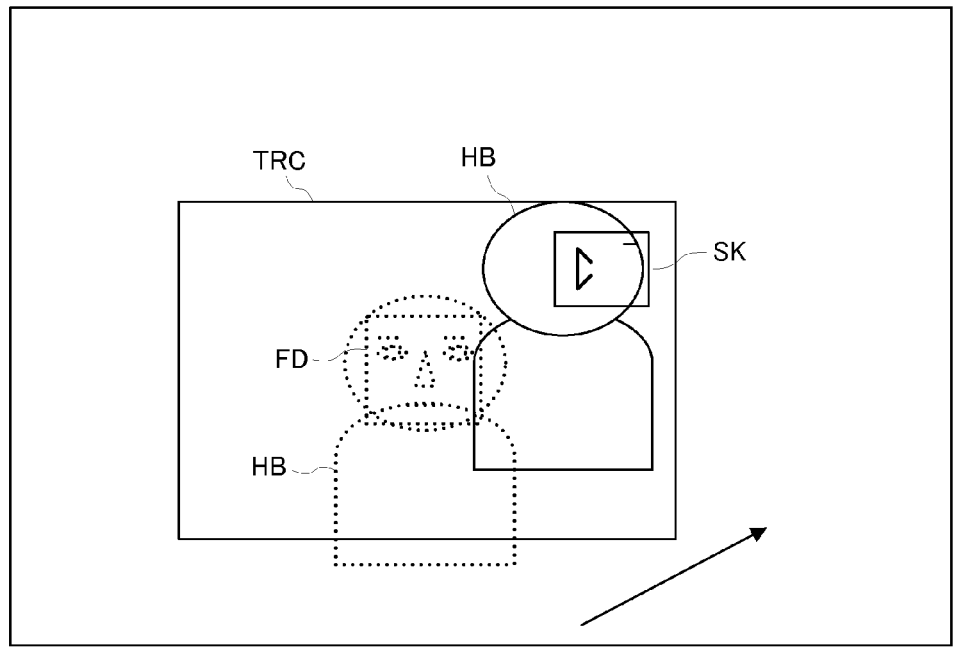
FIG. 13 is an illustrative view showing one example of a tracking information table referred to in a tracking process.
FIG. 14 is an illustrative view showing one portion of the tracking process.

The tracking information table TBL2 shown in FIG. 13 is equivalent to a table for holding information of a person assumed that a face image is undetected but exists in the angle of view, and is configured by: a column in which a number corresponding to the head-count/face direction management table TBL1 is described; a column in which a moving direction is described and a column in which a moving speed is described. It is noted that a plurality of records are created in the tracking information table TBL2 if there are a plurality of the people to be subject to the tracking process.

The CPU 34 searches for again the person whose face image is once detected but not detected in the subsequent face detection process in a manner not using the face direction pattern dictionary FPDC. However, with reference to FIG. 14, the CPU 34 regards a face position detected lastly as a reference, and sets a tracking search range TRC in which the face-detection frame structure FD is extended equally distant in a horizontal direction and a vertical direction by a predetermined amount as the search area. In the tracking process, instead of using the face direction pattern dictionary FPDC in the face detection process, the existence of the person is detected by searching a skin color area SK within the tracking search range TRC.

When the column "face direction pattern" of the record in the head-count/face direction management table TBL1 is updated to "NG" in the undetectable process, the CPU 34 newly creates the corresponding record in the tracking information table TBL2. Subsequently, regarding the column "face position" of the head-count/face direction management table TBL1 as a reference, the CPU 34 calculates the tracking search range TRC so as to search the skin color area SK.

In a case where the skin color area SK is discovered, it is assumed that the person moved from the position of the face image detected lastly to a position of the skin color area SK, and the column "final detection time" of the corresponding record in the head-count/face direction management table TBL1 is updated to the current time. Moreover, the moving direction and the moving speed of the person is calculated so as to describe in the tracking information table TBL2, by using the column "face position" of the corresponding record in the head-count/face direction management table TBL1 and the position of the skin color area SK. The position of the skin color area SK is regarded as the face position of the person, and therefore, the column "face position" of the corresponding record in the head-count/face direction management table TBL1 is updated with the position of the skin color SK.

Figure 15:
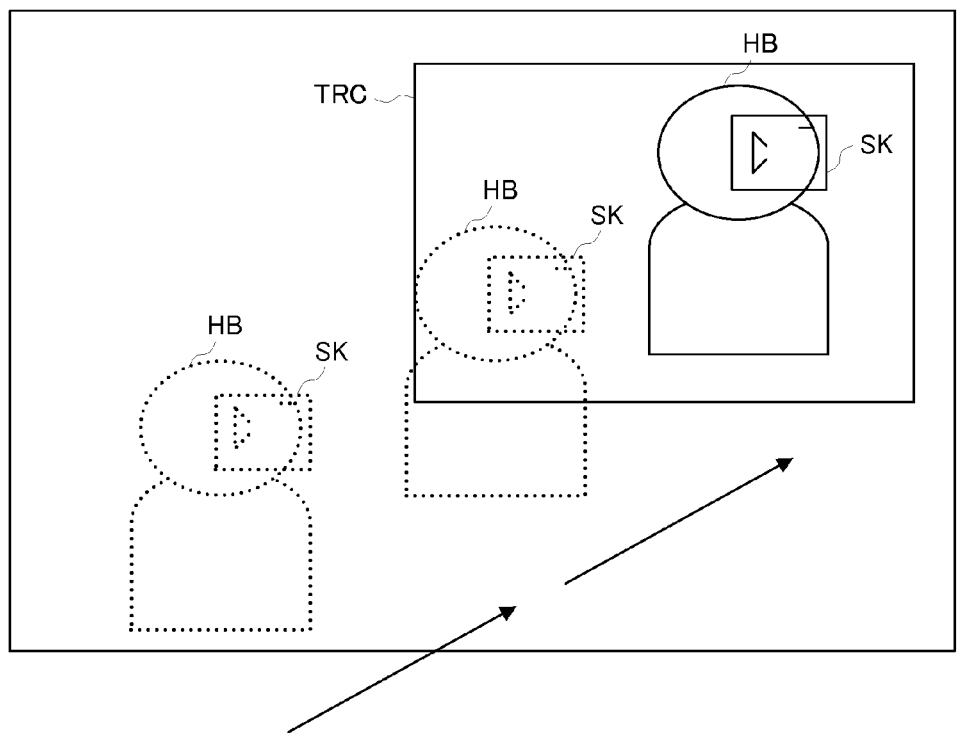
FIG. 15 is an illustrative view showing another portion of the tracking process.

In a case where the same face image failed to be continuously detected more than once in the face detection process, columns "moving direction" and "moving speed" of the tracking information table TBL2 are considered in calculation of the tracking search range TRC in addition to the column "face position" of the head-count/face direction management table TBL1. Specifically, with reference to FIG. 15, it is assumed that the person continuously moves toward the column "moving direction" of the tracking information table TBL2, and the tracking search range TRC is calculated so as to extend in the assumed moving direction and narrow in an opposite position. Moreover, an amount of extending and an amount of narrowing are adjusted corresponding to the column "moving speed".

In a case where the person whose record in the head-count/face direction management table TBL1 is updated by the tracking process turns the face again toward the digital video camera 10, the CPU 34 checks with the face direction pattern dictionary FPDC in the face detection process so as to update the column "face direction pattern" of the corresponding record in the head-count/face direction management table TBL1 to any one of "FP_1" to "FP_5". Moreover, the corresponding record in the tracking information table TBL2 is deleted. In a case where every person whose face image is detected faces the front and the given period of time has elapsed since the initial detection time of them, the flag FLG_fr is set to "1" so as to execute the recording process, etc.

In a case where the skin color area SK failed to be discovered in the tracking search range TRC, the CPU 34 determines whether or not the given period of time has elapsed since the final detection time. If the given period of time has not elapsed, a predicted position of the person is calculated by using the column "face position" of head-count/face direction management table TBL1 and the columns "moving direction" and "moving speed" of the tracking information table TBL2. If the calculated predicted position is inside of the angle of view, the column "face position" of the corresponding record in the head-count/face direction management table TBL1 is updated to the calculated predicted position. If the calculated predicted position is outside of the angle of view, it is assumed that the person has left, and then, the column "deletion flag" of the corresponding record in the head-count/face direction management table TBL1 is set to "1".

In a case where the columns "moving direction" and "moving speed" of the tracking information table TBL2 are vacant, i.e., in a case where even the skin color area SK failed to be discovered after failing to detect the face image in the face detection process, it is impossible to calculate the predicted position, and therefore, the column "face position" is not updated.

If the given period of time has elapsed since the final detection time, it is assumed that the person has left without the face image and the skin color SK being detected, and then, the column "deletion flag" is set to "1". The record in which the column "deletion flag" is set to "1" is deleted from the head-count/face direction management table TBL1, and concurrently, the corresponding record is deleted also from the tracking information table TBL2.

Figure 16:
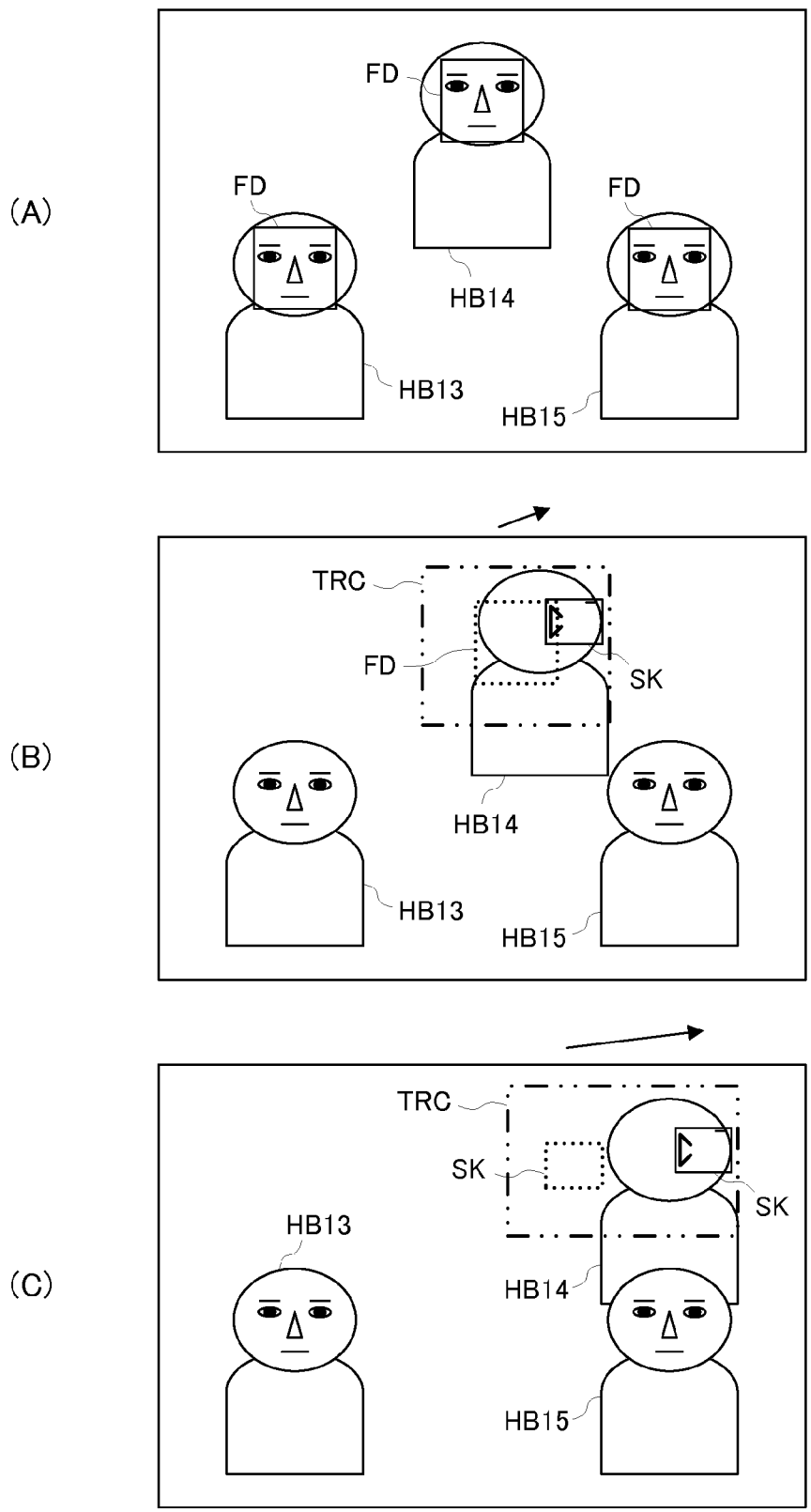
FIG. 16(A) is an illustrative view showing yet another example of the state where the plurality of people are captured by the imaging surface.
FIG. 16(B) is an illustrative view showing another example of the state where the plurality of people are captured by the imaging surface.
FIG. 16(C) is an illustrative view showing still another example of the state where the plurality of people are captured by the imaging surface.

With reference to FIG. 16(A), FIG. 16(B), FIG. 16(C), FIG. 17(A) and FIG. 17(B), the above-described tracking process will be specifically described as follows. FIG. 16(A) indicates a state of the scene at a time of executing the first face detection process, FIG. 16(B) indicates a state of the scene at a time of executing the first tracking process, and FIG. 16(C) indicates a state of the scene at a time of executing the second tracking process, FIG. 17(A) indicates a state of the scene at a time of executing the fourth face detection process after a given period of time has elapsed since the first face detection process, and FIG. 17(B) indicates a state of the scene at a time of executing the third tracking process when there is a face image undetected by the fourth face detecting process.

In a state of FIG. 16(A), face images of three people HB13, HB14 and HB15 are detected. Moreover, every person faces the front but a given period of time has not elapsed since they are detected firstly, and therefore, the flag FLG_fr is not set to "1".

In a state of FIG. 16(B), since a face image is undetected as a result of the person HB14 turning around, the column "face direction pattern" of the head-count/face direction management table TBL1 is updated to "NG", and then, the tracking process is executed. The person HB14 moves to the upper right, however, since the tracking search range TRC is set based on the face position detected by the first face detection process and the skin color area SK is detected within the range, it is assumed that the person HB14 exists at a position of the skin color area SK. A moving direction and a moving speed of the person HB14 are calculated based on the face position detected by the first face detection process and the position of the skin color area SK so as to be described in the tracking information table TBL2. Moreover, the head-count/face direction management table TBL1 is updated by regarding the position of the skin color area SK as the face position.

In a state of FIG. 16(C), the person HB14 continues to move remaining his face turned around, and as a result, the face image is not detected by the face detection process. Therefore, the tracking process is executed. The tracking search range TRC is widely set in the upper right based on a position of the skin color area SK, a moving direction and a moving speed which are detected or calculated by the first tracking process. Then, since the skin color area SK is detected within the set tracking search range TRC, it is assumed that the person HB14 exists at the position of the skin color area SK. Based on the position of the skin color area SK, the moving direction, the moving speed and the face position are updated.

Figure 17:
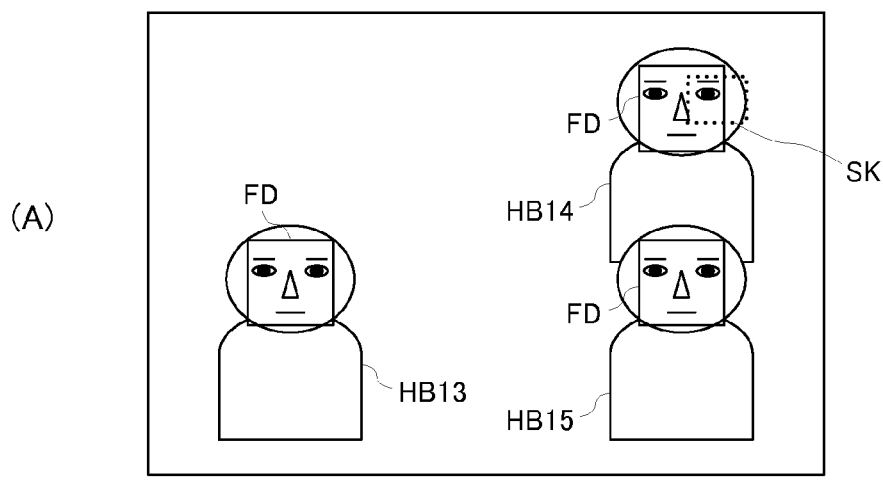
FIG. 17(A) is an illustrative view showing yet another example of the state where the plurality of people are captured by the imaging surface.
FIG. 17(B) is an illustrative view showing another example of the state where the plurality of people are captured by the imaging surface.
Figure 17:
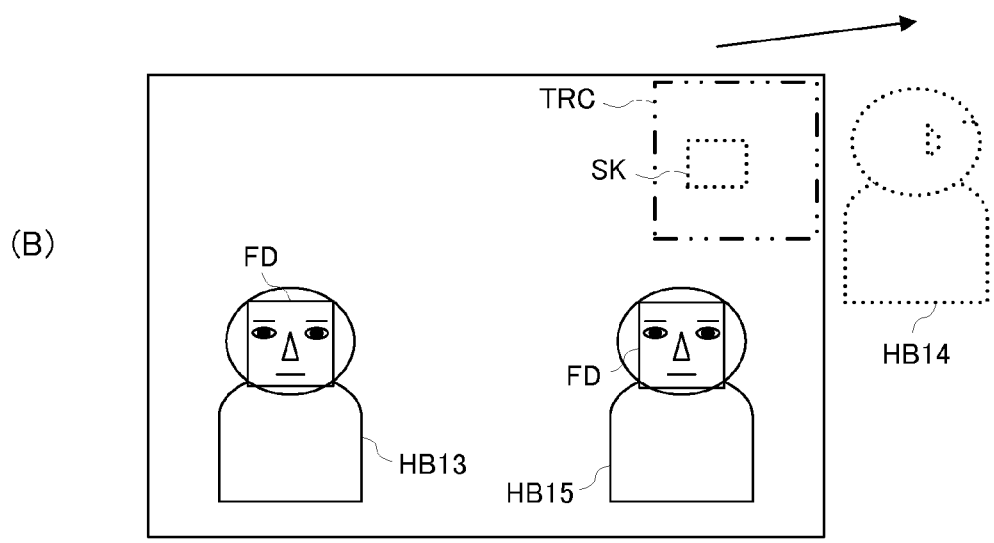

In a state of FIG. 17(A), the person HB14 faces the front, and therefore, the column "face direction pattern" is updated to "FP_1" in the face detection process. Moreover, both the people HB13 and HB15 face the front and the given period of time has elapsed since the initial detection time of all of the people, and therefore, the flag FLG_fr is set to "1". Therefore, the strict AE process, the AF process, the still-image taking process and the recording process are executed in the state of FIG. 17(A).

In a state of FIG. 17(B), the person HB14 further continues to move from the state of FIG. 16(C), and is being outside of the angle of view as a result. Since the face image is not detected by the face detection process, the tracking process is executed. However, since the person HB14 is being outside of the angle of view, the skin color area SK is undetected within the tracking search range TRC. Therefore, the predicted position is calculated based on a position of the skin color area SK, a moving direction and a moving speed which are detected or calculated by the third tracking process. The calculated predicted position is being outside of the angle of view, and therefore, the column "deletion flag" of the corresponding record in the head-count/face direction management table TBL1 is set to "1" so as to delete the record. Concurrently, the corresponding record in the tracking information table TBL2 is deleted. The people HB13 and HB15 whose records remain in the head-count/face direction management table TBL1 face the front and the given period of time has elapsed since the initial detection time of them, and therefore, the flag FLG_fr is set to "1". Therefore, the strict AE process, the AF process, the still-image taking process and the recording process are executed in the state of FIG. 17(B) in which two people exist in the angle of view.

Figure 18:
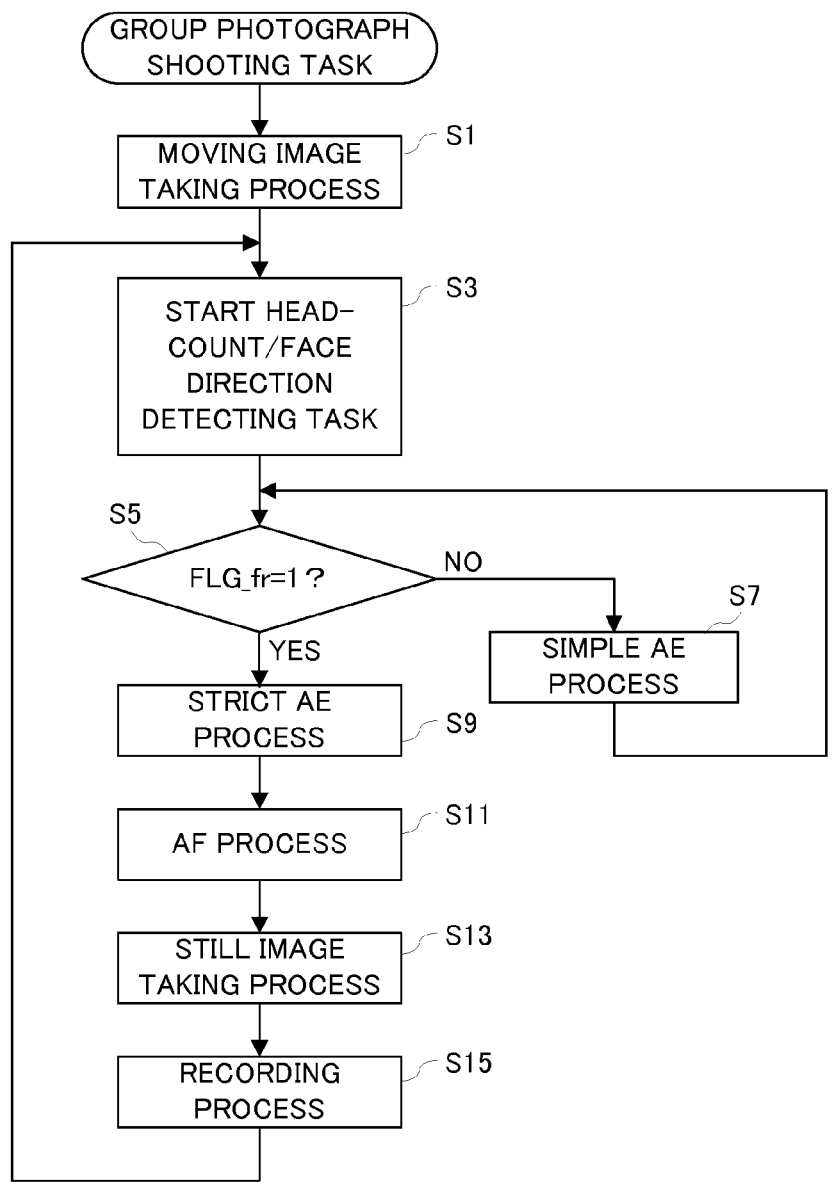
FIG. 18 is a flowchart showing one portion of behavior of a CPU applied to the embodiment in FIG. 2.

The CPU 34 executes a plurality of tasks including the group photograph shooting task shown in FIG. 18 and the head-count/face direction detecting task shown in FIG. 19 to FIG. 28. It is noted that control programs corresponding to these tasks are memorized in a flash memory 42.

With reference to FIG. 18, in a step S1, the moving-image taking process is started, and as a result, the through image representing the scene is displayed on the LCD monitor 30. In a step S3, the head-count/face direction detecting task is started up.

The flag FLG_fr is set to "0" as an initial setting under the started-up head-count/face direction detecting task, and is updated to "1" when the face direction of every person whose face image is detected by the face detection process is front and the given period of time has elapsed since the initial detection time of all of them. In a step S5, it is repeatedly determined whether or not the flag FLG_fr is updated to "1", and as long as a determined result is NO, the simple AE process is repeatedly executed in a step S7. A brightness of the through image is moderately adjusted by the simple AE process.

When the determined result is updated from NO to YES, the strict AE process is executed in a step S9, and thereafter, the AF process is executed in a step S11. As a result of the strict AE process and the AF process, the brightness and the focus of the through image are adjusted strictly.

In a step S13, the still-image taking process is executed. In a step S15, the recording process is executed, and thereafter, the process returns to the step S3.

Figure 19:
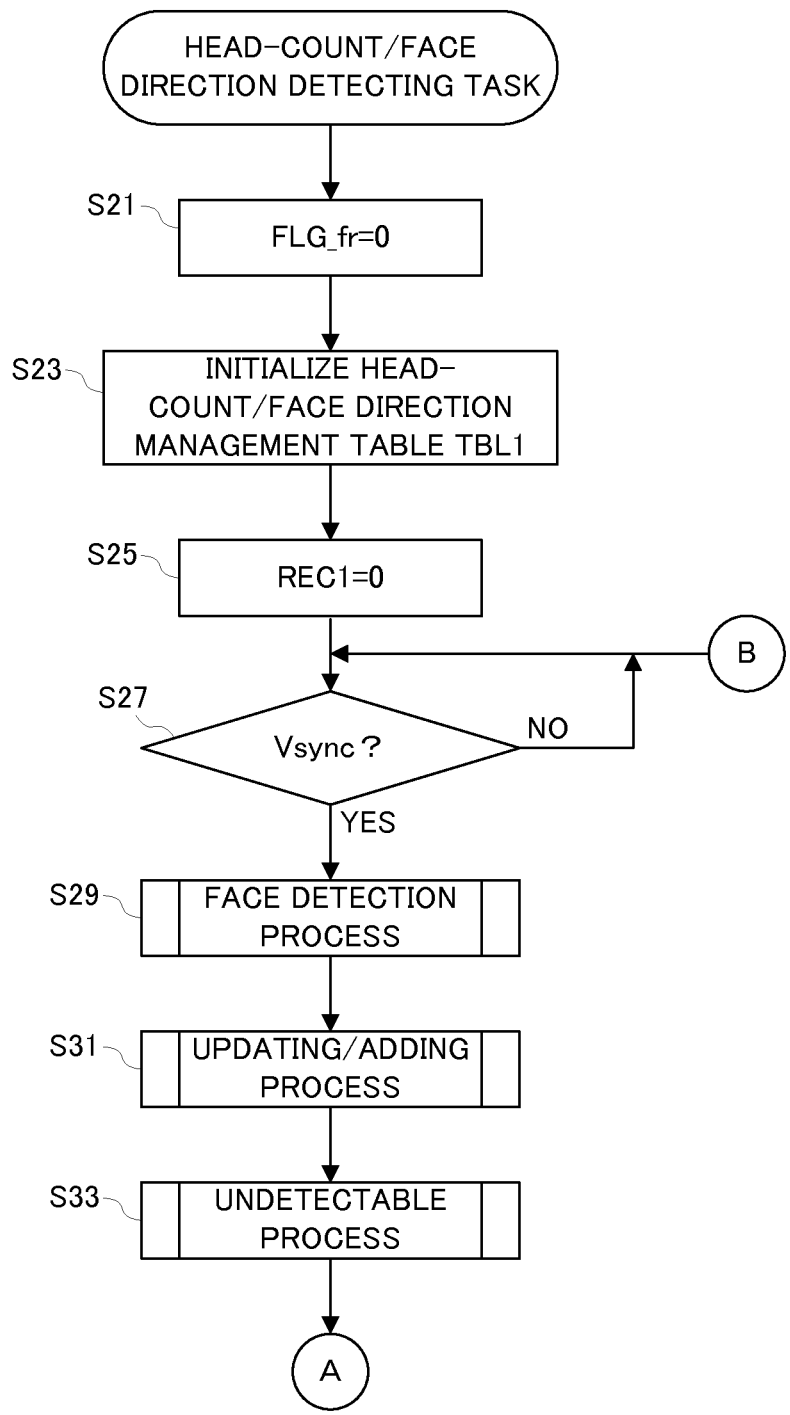
FIG. 19 is a flowchart showing another portion of behavior of the CPU applied to the embodiment in FIG. 2.
Figure 20:
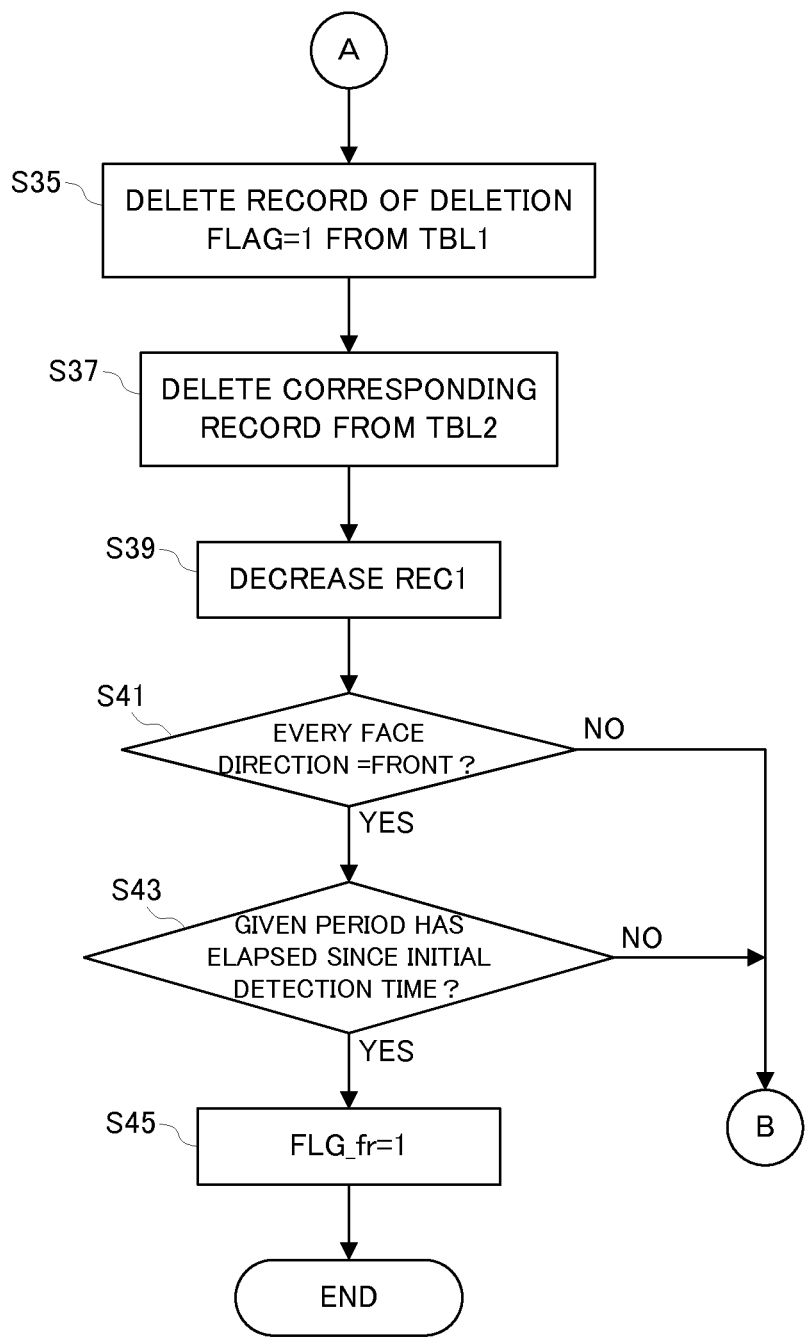
FIG. 20 is a flowchart showing still another portion of behavior of the CPU applied to the embodiment in FIG. 2.

With reference to FIG. 19, in a step S21, the flag FLG_fr is set to "0", and in a step S23, the head-count/face direction management table TBL1 is initialized. Moreover, in a step S25, a variable REC1 representing the number of the records in the head-count/face direction management table TBL1 is set to "0".

In a step S27, it is determined whether or not the vertical synchronization signal Vsync is generated. When a determined result is updated from NO to YES, in a step S29, the face detection process is executed in order to search for the face image of the person from the image data accommodated in the search image area 24c.

Upon completion of the face detection process, in a step S31, the updating/adding process is executed in order to update the information of the face image once detected. Upon completion of the updating/adding process, in a step S33, the undetectable process is executed in order to manage the information of the face image once detected but not detected thereafter.

Upon completion of the undetectable process, in a step S35, the record in which the deletion flag is set to "1" is deleted from the head-count/face direction management table TBL1, and in a step S37, the corresponding record is deleted from the tracking information table TBL2. Moreover, in a step S39, the variable REC1 is decreased by the number of the records deleted from the head-count/face direction management table TBL1 in the step S35.

In a step S41, it is determined whether or not every person whose face image is detected with reference to the head-count/face direction management table TBL1 faces the front, and when a determined result is NO, the process returns to the step S27 while YES is determined, the process advances to a step S43.

In the step S43, it is determined whether or not the given period of time has elapsed since the initial detection time of every person whose face image is detected with reference to the head-count/face direction management table TBL1, and when a determined result is NO, the process returns to the step S27 while when YES is determined, the process advances to a step S45.

In the step S45, the flag FLG_fr is set to "1", and thereafter, the process is ended.

Figure 21:
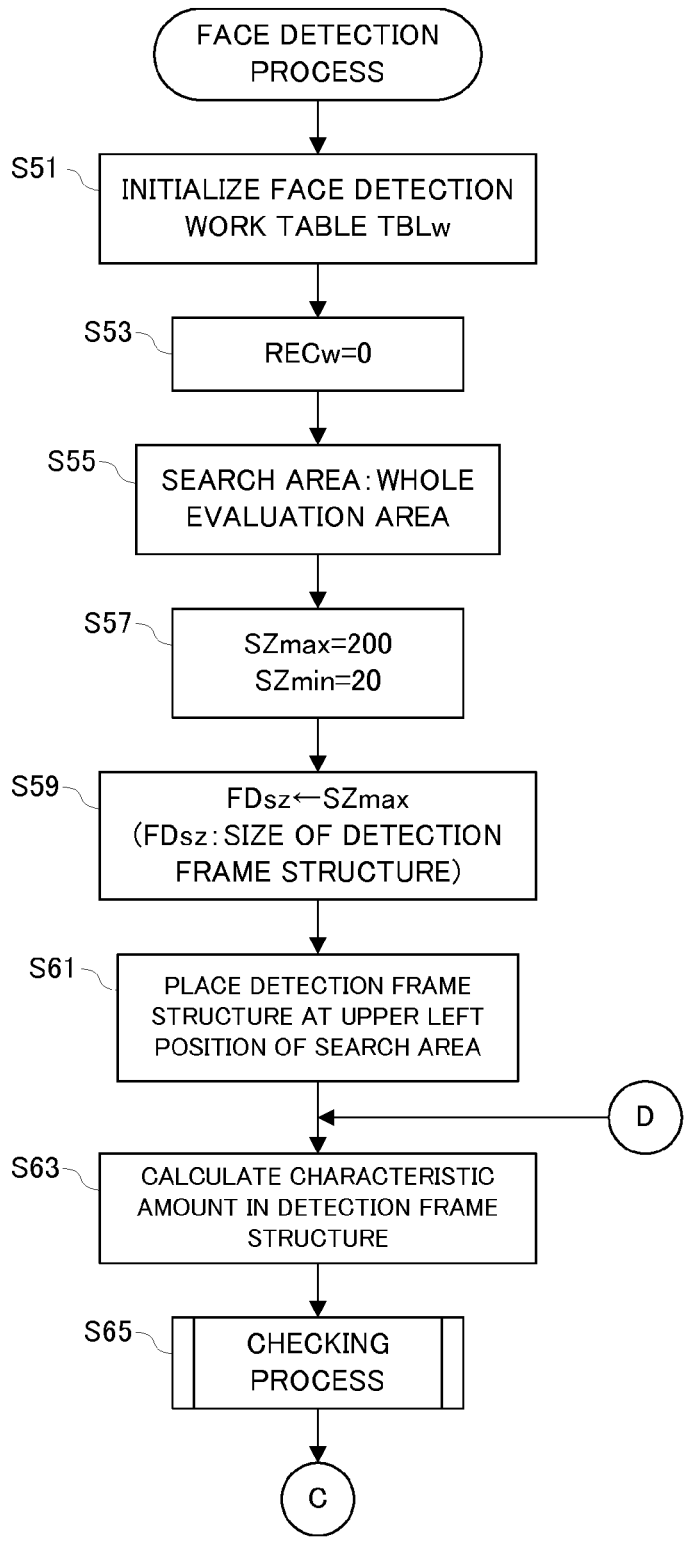
FIG. 21 is a flowchart showing yet another portion of behavior of the CPU applied to the embodiment in FIG. 2.
Figure 22:
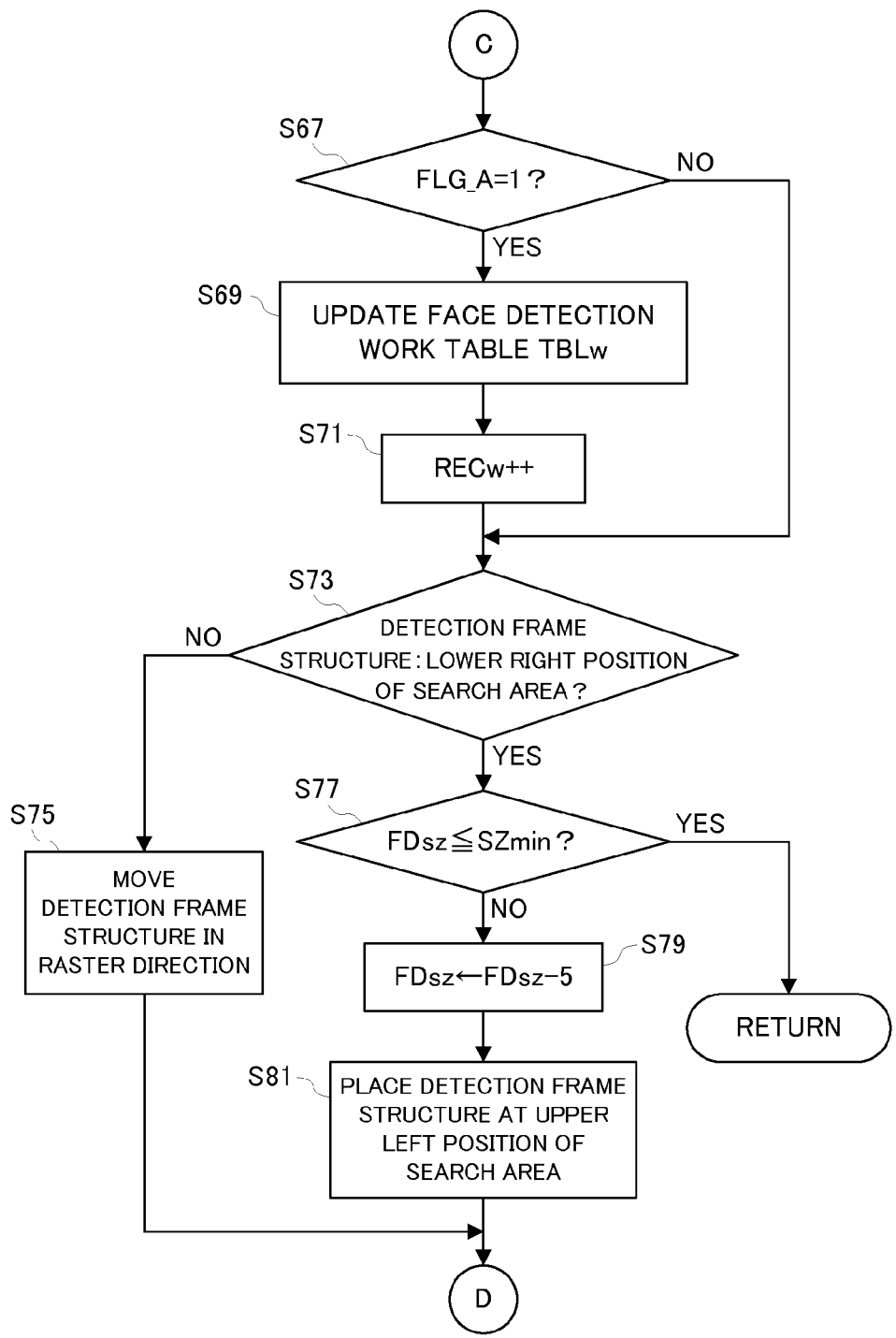
FIG. 22 is a flowchart showing another portion of behavior of the CPU applied to the embodiment in FIG. 2.

The face detection process in the step S29 shown in FIG. 19 is executed according to a subroutine shown in FIG. 21 to FIG. 22. Firstly, in a step S51, the face detection work table TBLw is initialized. In a step S53, a variable RECw indicating the number of the records in the face detection work table TBLw is set to "0".

In a step S55, the whole evaluation area EVA is set as the search area in the face detection process.

In a step S57, in order to define a variable range of the size of the face-detection frame structure FD, the maximum size SZmax of the face-detection frame structure FD is set to "200", and the minimum size SZmin is set to "20". In a step S59, the size of the face-detection frame structure FD is set to "SZmax", and in a step S61, the face-detection frame structure FD is placed at an upper left position of the search area.

In a step S63, a partial image data belonging to the face-detection frame structure FD is read out from the search image area 24c so as to calculate the characteristic amount of the read-out image data. In a step S65, a checking process of checking the calculated characteristic amount with the characteristic amount of the face direction pattern contained in the face direction pattern dictionary FPDC is executed.

The flag FLG_A is set to "0" as the initial setting under the checking process, and is updated to "1" when the face image of the person is detected from the image data belonging to the face-detection frame structure FD. In a step S67, it is determined whether or not the flag FLG_A is updated to "1", and when a determined result is NO, the process advances to a step S73. When the determined result is YES, in a step S69, the current position of the face-detection frame structure FD, the size of the face-detection frame structure FD at the current time point and the face direction pattern in which the checking degree is highest in the checking process are described in the face-detection work table TBLw. In a step S71, the variable RECw is incremented.

In the step S73, it is determined whether or not the face-detection frame structure FD reaches the lower right position of the search area. When a determined result is NO, in a step S75, the face-detection frame structure FD is moved in the raster direction by a predetermined amount, and thereafter, the process returns to the step S63. When the determined result is YES, it is determined whether or not the size of the face-detection frame structure FD is equal to or less than "SZmin" in a step S77. When a determined result is NO, in a step S79, the size of the face-detection frame structure FD is reduced by "5", and in a step S81, the face-detection frame structure FD is placed at the upper left position of the search area. Thereafter, the process returns to the step S63. When the determined result of the step S77 is YES, the process returns to the routine in an upper hierarchy.

Figure 23:
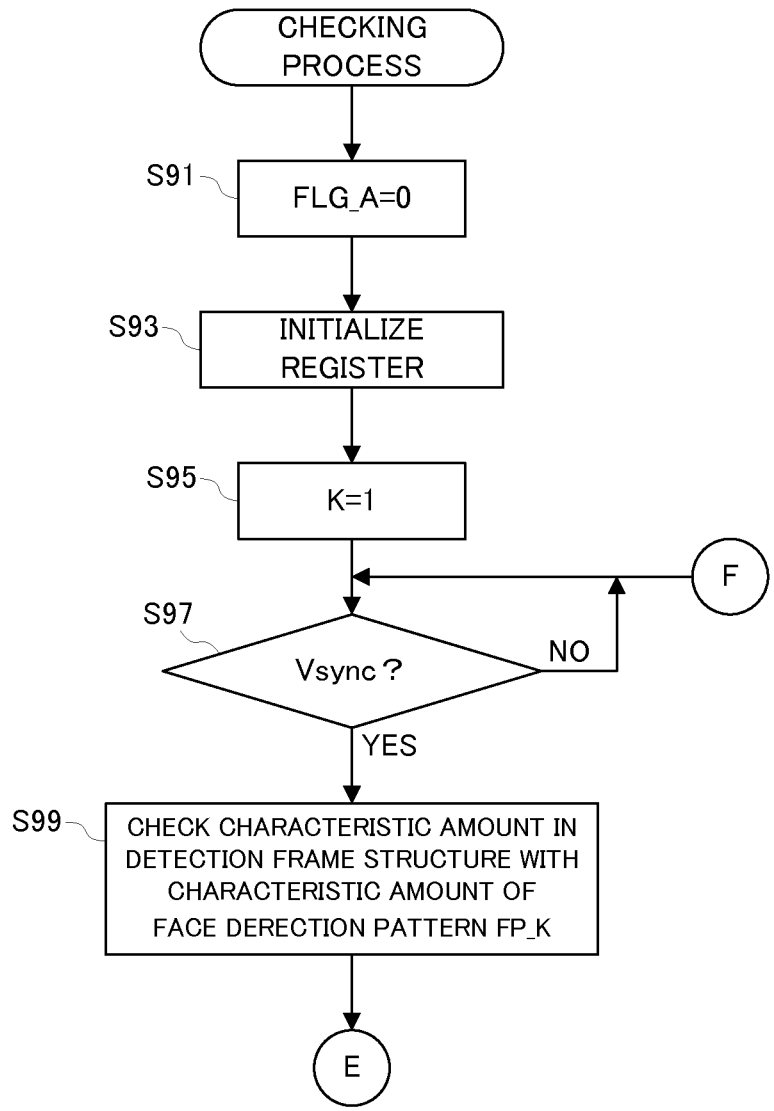
FIG. 23 is a flowchart showing still another portion of behavior of the CPU applied to the embodiment in FIG. 2.
Figure 24:
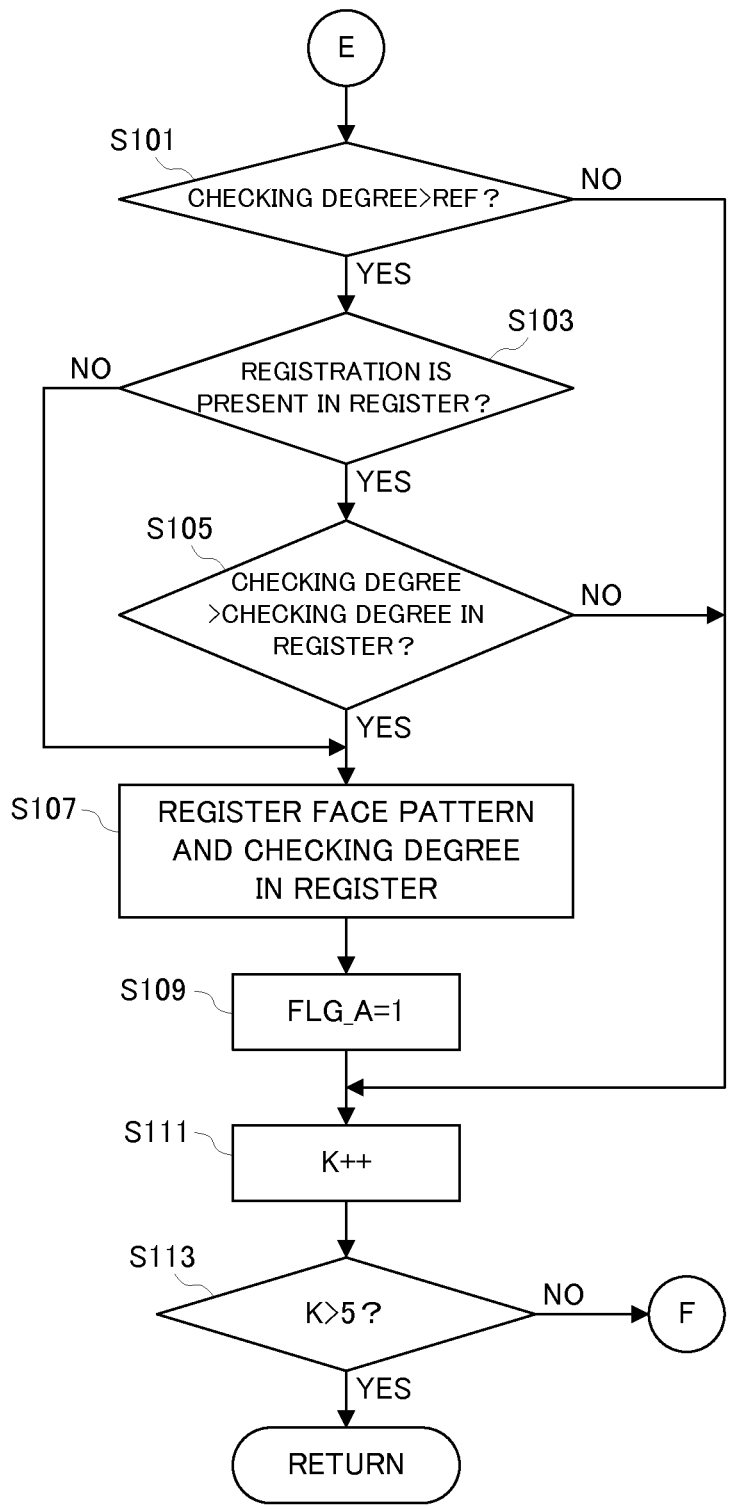
FIG. 24 is a flowchart showing yet another portion of behavior of the CPU applied to the embodiment in FIG. 2.

The checking process in the step S65 shown in FIG. 21 is executed according to a subroutine shown in FIG. 23 to FIG. 24. Firstly, in a step S91, the flag FLG_A is set to "0", and in a step S93, the register RGST1 is initialized.

In a step S95, the variable K is set to "1", and in a step S97, it is determined whether or not the vertical synchronization signal Vsync is generated. When a determined result is updated from NO to YES, in a step S99, the characteristic amount of the image data belonging to the face-detection frame structure FD is checked with the characteristic amount of the face direction pattern contained in the face direction pattern dictionary FPDC, and in a step S101, it is determined whether or not the checking degree exceeds the reference REF.

When a determined result is NO, in a step S111, the variable K is incremented, and in a step S113, it is determined whether or not the incremented variable K exceeds "5". When K≦5 is established, the process returns to the step S97 while when K>5 is established, the process returns to the routine in the upper hierarchy.

When the determined result of the step S101 is YES, in a step S103, it is determined whether or not the checking degree registered in the register RGST1 presents. When a determined result is NO, the process advances to a step S107 while when YES is determined, in a step S105, it is determined whether or not the checking degree calculated in the step S99 is higher than the checking degree registered in the register RGST1.

When the determined result of the step S105 is NO, the process advances to the step S111 while when YES is determined, in the step S107, the face direction pattern FP_K and the checking degree calculated in the step S99 are registered in the register RGST1. In a step S109, the flag FLG_A is set to "1", and thereafter, the process advances to the step S111.

Figure 25:
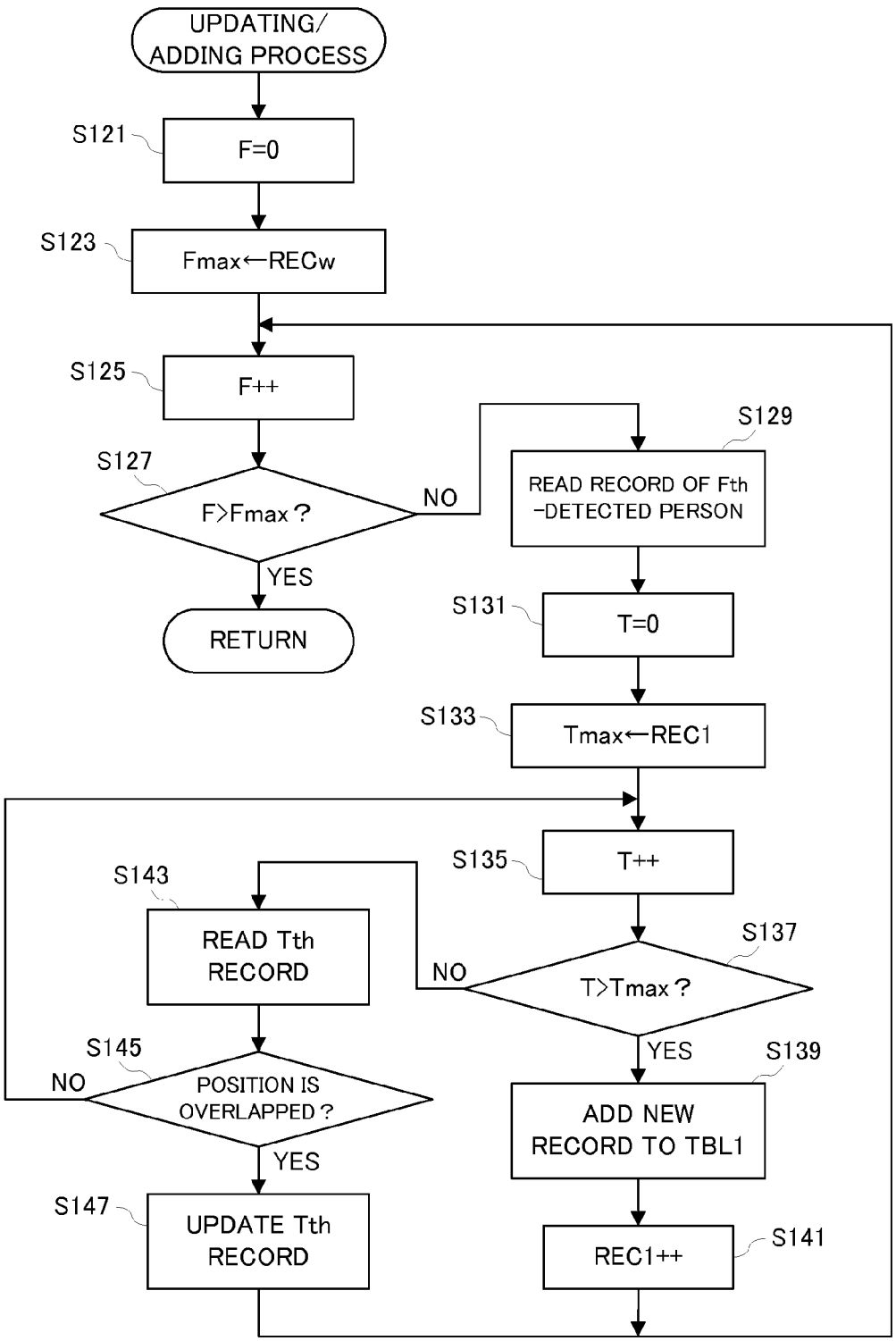
FIG. 25 is a flowchart showing another portion of behavior of the CPU applied to the embodiment in FIG. 2.

The updating/adding process in the step S31 shown in FIG. 19 is executed according to a subroutine shown in FIG. 25. Firstly, in a step S121, a variable F is set to "0", and in a step S123, a variable Fmax is set to a value in which the variable RECw indicates.

In a step S125, the variable F is incremented. In a step S127, it is determined whether or not the variable F exceeds a value of the variable Fmax, and when a determined result is YES, the process returns to the routine in the upper hierarchy.

When the determined result is NO, in a step S129, the Fth record in the face-detection work table TBLw, i.e., the record of the Fth-detected person in the face detection process is read out.

In a step S131, a variable T is set to "0", and in a step S133, a variable Tmax is set to the value in which the variable REC1 indicates.

In a step S135, the variable T is incremented. In a step S137, it is determined whether or not the variable T exceeds a value of the variable Tmax, and when a determined result is NO, the process advances to a step S143 while when YES is determined, the process advances to a step S139.

In the step S139, the new record is added to the head-count/face direction management table TBL1, and in the columns "face position", "face size" and "face direction pattern", contents same as columns having the same names of the face-detection work table TBLw read out in the step S129 are described. Both in the columns "initial detection time" and "final detection time", the current time is described.

In a step S141, the variable REC1 is incremented, and thereafter, the process returns to the step S125.

In the step S143, the Tth record in the head-count/face direction management table TBL1 is read out. In a step S145, it is determined whether or not the face positions of the two records read out in the steps S129 and S143 are overlapped. When a determined result is NO, the process returns to the step S135 while when YES is determined, the process advances to a step S147.

In the step S147, the columns "face position", "face size" and "face direction pattern" of the Tth records in the head-count/face direction management table TBL1 are updated with the contents same as the columns having the same names in the face-detection work table TBLw read out in the step S129. Moreover, the column "final detection time" is updated to the current time. Thereafter, the process returns to the step S125.

Figure 26:
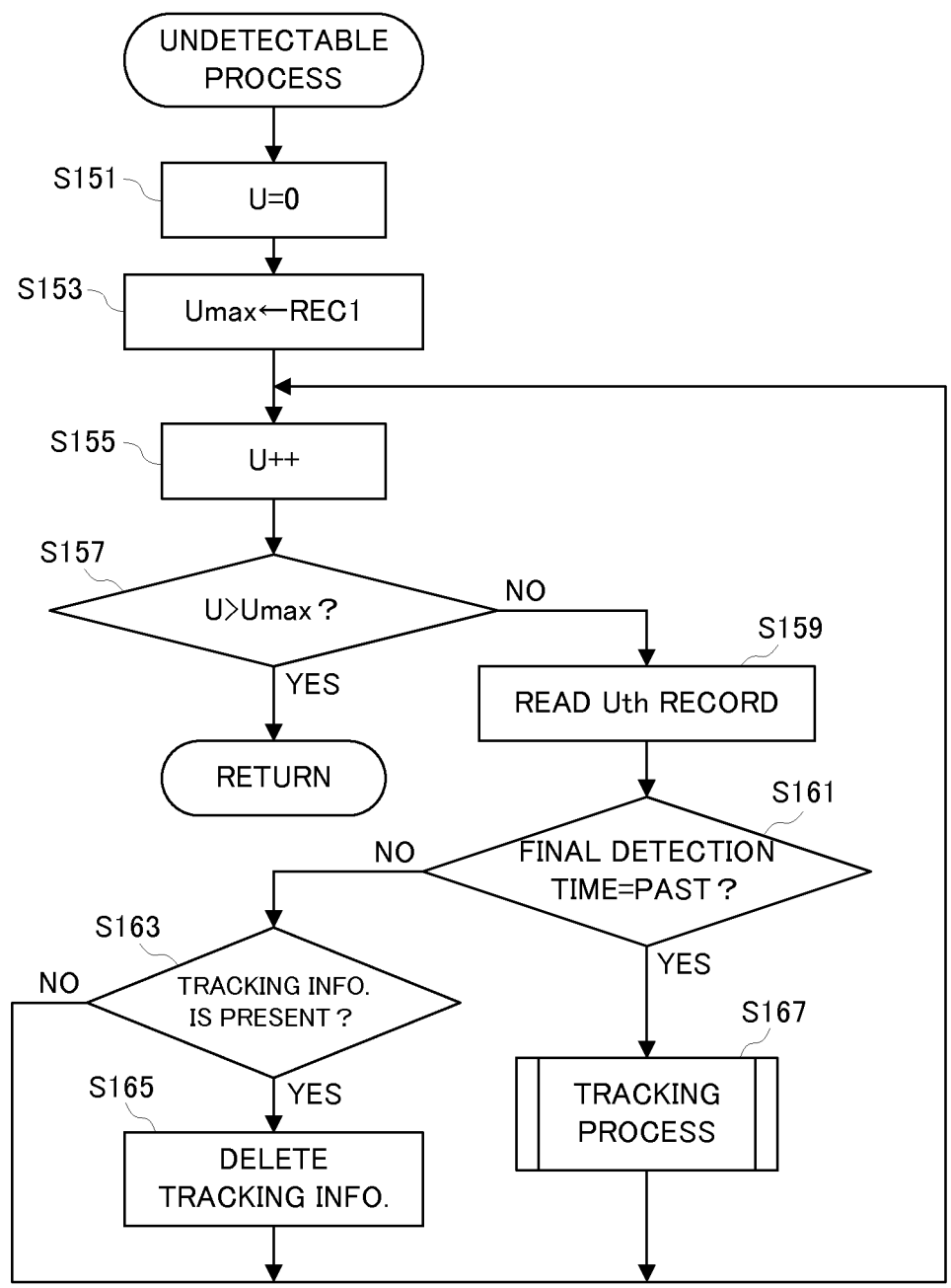
FIG. 26 is a flowchart showing still another portion of behavior of the CPU applied to the embodiment in FIG. 2.

The undetectable process in the step S33 shown in FIG. 19 is executed according to a subroutine shown in FIG. 26. Firstly, in a step S151, a variable U is set to "0", and in a step S153, a variable Umax is set to the value in which the variable REC1 indicates.

In a step S155, the variable U is incremented. In a step S157, it is determined whether or not the variable U exceeds a value of the variable Umax, and when a determined result is YES, the process returns to the routine in the upper hierarchy. When the determined result is NO, in a step S159, the Uth record in the head-count/face direction management table TBL1 is read out.

In a step S161, it is determined whether or not the column "final detection time" of the record read out in the step S159 is a past time earlier than the immediately preceding updating/adding process. When a determine result is NO, the process advances to a step S163 while when YES is determined, the process advances to a step S167.

In the step S163, it is determined whether or not the corresponding record presents in the tracking information table TBL2, and when a determined result is NO, the process returns to the step S155. When the determined result is YES, in a step S165, the corresponding record is deleted from the tracking information table TBL2, and thereafter, the process returns to the step S155.

In the step S167, the tracking process is executed in order to comprehend the existence of the person whose face image is undetected in the angle of view. Upon completion of the tracking process, the process returns to the step S155.

Figure 27:
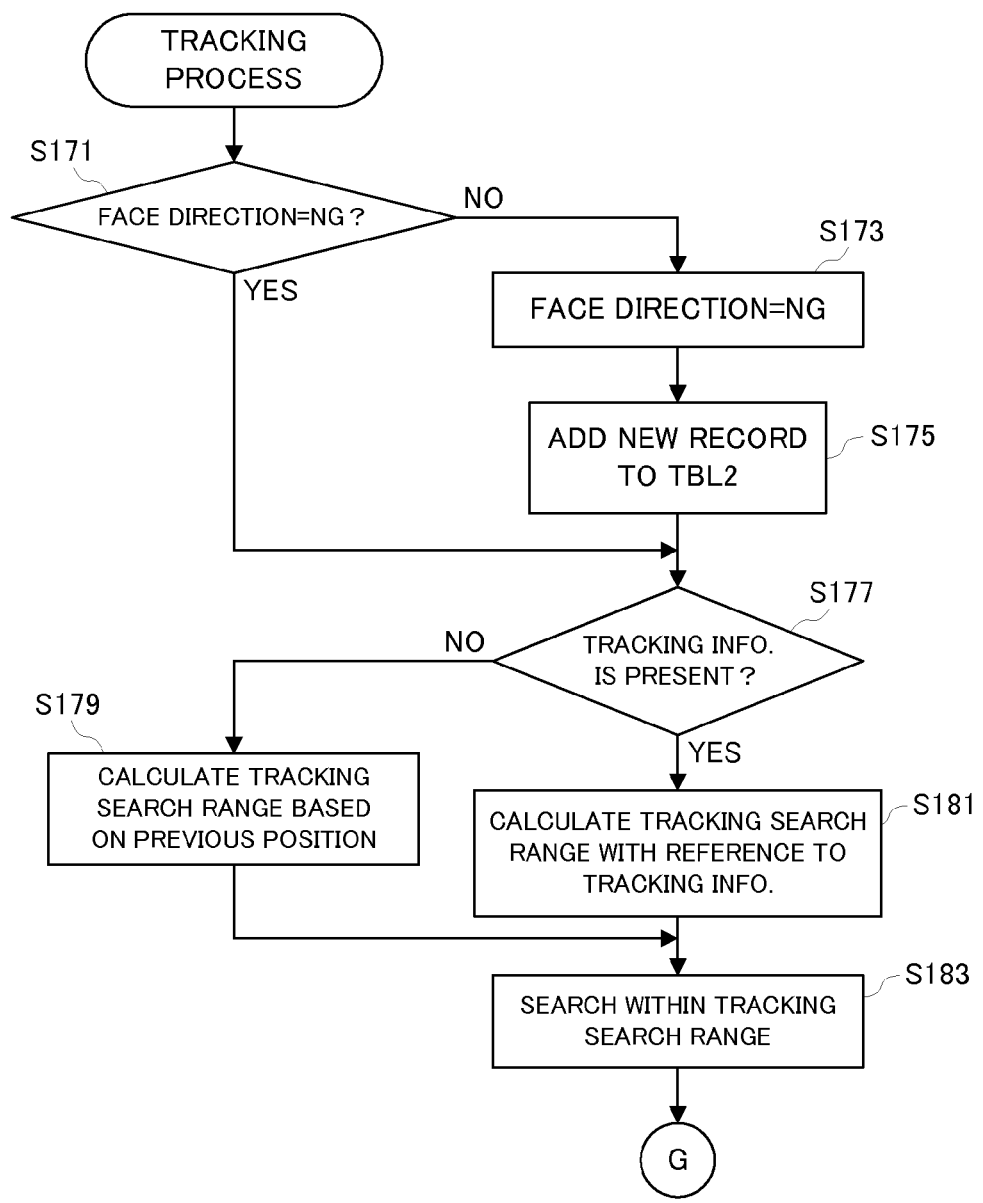
FIG. 27 is a flowchart showing yet another portion of behavior of the CPU applied to the embodiment in FIG. 2.
Figure 28:
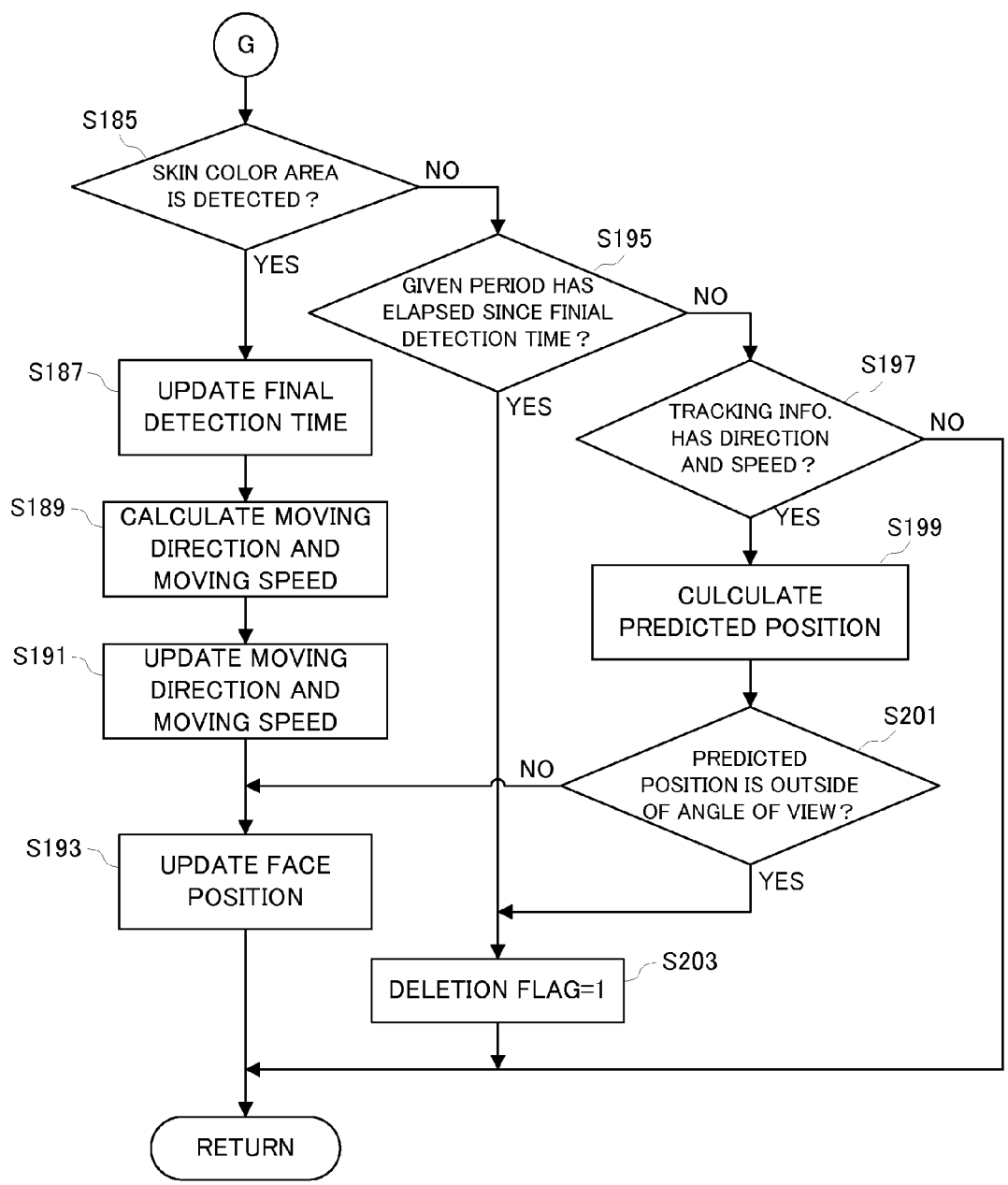
FIG. 28 is a flowchart showing another portion of behavior of the CPU applied to the embodiment in FIG. 2.

The tracking process in the step S167 shown in FIG. 26 is executed according to a subroutine shown in FIG. 27 and FIG. 28.

In a step S171, it is determined whether or not the column "face direction" of the record read out in the step S159 of the undetectable process is set to "NG", and when a determined result is YES, the process advances to a step S177 while when NO is determined, the process advances to a step S173.

In the step S173, the column "face direction" of the record read out in the step S159 of the undetectable process is set to "NG", and in a step S175, the new record is added to the tracking information table TBL2.

In the step S177, it is determined whether or not the columns "moving direction" and "moving speed" are described in the corresponding record in the tracking information table TBL2.

When a determined result is NO, in a step S179, the tracking search range TRC is calculated based on the column "face position" of the record read out in the step S159 of the undetectable process, and thereafter, the process advances to a step S183.

When the determined result is YES, in a step S181, the tracking search range TRC is calculated based on the column "face position" of the head-count/face direction management table TBL1 read out in the step S159 of the undetectable process and the columns "moving direction" and "moving speed" of the corresponding record in the tracking information table TBL2. Thereafter, the process advances to the step S183.

In the step S183, the skin color area SK is searched within the tracking search range TRC calculated in the steps S179 or S181.

In a step S185, it is determined whether or not the skin color area SK is detected in the step S183, and when a determined result is YES, the process advances to a step S187 while when NO is determined, the process advances to a step S195.

In the step S187, the column "final detection time" of the record read out in the step S159 of the undetectable process is updated to the current time.

In a step S189, the moving direction and the moving speed of the person are calculated by using the column "face position" of the record read out in the step S159 of the undetectable process and the position of the skin color area SK. In a step S191, the moving direction and the moving speed of the person calculated in the step S189 is described in the tracking information table TBL2.

In a step S193, the column "face position" of the record read out in the step S159 of the undetectable process is updated to the position of the skin color area SK or the predicted position calculated in a step S199 described later, and thereafter, the process returns to the routine in the upper hierarchy.

In the step S195, it is determined whether or not the given period of time has elapsed since the column "final detection time" of the record read out in the step S159 of the undetectable process, and when a determined result is NO, the process advances to a step S197 while when YES is determined, the process advances to a step S203.

In the step S197, it is determined whether or not the columns "moving direction" and "moving speed" are described in the corresponding record in the tracking information table TBL2, and when a determined result is NO, the process returns to the routine in the upper hierarchy while when YES is determined, the process advances to the step S199.

In the step S199, the predicted position of the person is calculated by using the column "face position" of the record read out in the step S159 of the undetectable process and the columns "moving direction" and "moving speed" of the corresponding record in the tracking information table TBL2.

In a step S201, it is determined whether or not the predicted position calculated in the step S199 is outside of the angle of view. When a determined result is YES, the process advances to the step S203 while when NO is determined, the process advances to the step S193.

In the step S203, the column "deletion flag" of the record read out in the step S159 of the undetectable process is set to "1", and thereafter, the process returns to the routine in the upper hierarchy.

As can be seen from the above-described explanation, the image sensor 16 repeatedly outputs the scene image generated on the imaging surface capturing the scene. The CPU 34 repeatedly executes the process of searching for the specific object image from the scene image outputted from the image sensor 16 by using the plurality of reference-use specific object images each of which has a posture different from others (S29), and detects the number of the specific objects existing in the object scene based on the searched result (S25, S31 to S39). Moreover, the CPU 34 repeatedly determines based on the searched result whether or not all of the specific objects equivalent to the detected number satisfy the posture condition (S41, S43), and records the scene image outputted from the image sensor 16 when the determined result is updated from the negative result to the positive result (S5 to S15, S45).

The searching process is executed by using the plurality of reference-use specific object images each of which has a posture different from others, and therefore, the number and postures of the specific object images are specified for each scene image. Moreover, the searching process is repeatedly executed, and therefore, the number of the specific objects existing in the object scene becomes identified by referring to the plurality of the searched results.

Whether or not all of the specific objects existing in the object scene satisfy the posture condition is repeatedly determined based on the result of the searching process, and the process for recording the scene image is executed when the determined result is updated from the negative result to the positive result.

As a result, the recorded scene image becomes the scene image which is generated in the state where all of the specific objects existing in the object scene satisfy the posture condition. Thereby, it becomes possible to improve the quality of the recorded scene image.

It is noted that, in the tracking process in this embodiment, the existence of the person is detected by searching for the skin color area SK within the tracking search range TRC. However, the existence of the person may be detected by holding such as color information, luminance information, or shape information of the image data belonging to the face-detection frame structure FD at a time of the face image being detected by the face detection process and searching for, at a time of the tracking process, a region in which a checking degree corresponding to these held information exceeds a certain level, within the tracking search range TRC.

Moreover, in this embodiment, five patterns FP_1 to FP_5 are assumed as the face direction patterns of the people contained in the face direction pattern dictionary FPDC. However, the checking process may be executed by containing face patterns which are equal to or more than five patterns or less than five patterns.

Moreover, in this embodiment, in a case where the flag FLG_fr is set to "1", the recording process, etc. are automatically performed. However, unless a photographer presses the shutter button manually through a key input device 36, the recording process, etc. may be prevented to be executed. In this case, the recording process is executed if the flag FLG_fr is set to "1" at a time of the photographer trying to photograph, however, a warning may be generated instead of executing the recording process if the flag FLG_fr is set to "0".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
  an imager which repeatedly outputs an electronic image generated on an imaging surface capturing a scene;
  a searcher which repeatedly searches for a specific object from the scene by checking the electronic image outputted from said imager against a plurality of dictionary images each of which represents the specific object captured from a view point different from others;
  a detector which detects the number of the specific objects existing in the scene based on search results of said searcher;
  a specifier which specifies based on the search results of said searcher a timing of all of the specific objects equivalent to the number detected by said detector facing a common direction; and
  a recorder which records the electronic image outputted from said imager at the timing specified by said specifier.

2. An electronic camera according to claim 1, wherein said detector includes an information register which registers specific object information including a position of the specific object discovered by said searcher and a discovery time by said searcher and a measurer which measures the number of the specific object based on the specific object information registered by said information register.

3. An electronic camera according to claim 2, wherein said information register includes an updater which updates the already registered specific object information by the latest specific object information, a tracker which tracks the specific object existing in the scene based on the position of the specific object discovered by said searcher, and a controller which controls an updating manner of said updater based on a track result of said tracker.

4. An electronic camera according to claim 3, wherein said tracker includes a calculator which calculates a tracking search range based on the position of the specific object discovered by said searcher, and a tracking search processor which searches for a skin color area in the tracking search range calculated by said calculator.

5. An electronic camera according to claim 2, wherein said detector further includes a deleter which deletes the already registered specific object information based on the search results of said searcher after registering the specific object information by said information register.

6. An electronic camera according to claim 1, wherein said searcher includes a checker which checks a partial image designated on the electronic image with each of the plurality of dictionary images so as to calculate a checking degree and a register which registers a dictionary image corresponding to a checking degree exceeding a reference out of the checking degrees calculated by said checker, and said specifier specifies the timing with reference to the dictionary image registered by said register.

7. An electronic camera according to claim 1, wherein the specific object is a face of a person.

8. A non-transitory recording medium storing a computer program in order to control an electronic camera provided with an imager which repeatedly outputs an electronic image generated on an imaging surface capturing a scene, the program causing a processor of the electronic camera to execute the instructions comprising:

a searching instruction to repeatedly search for a specific object from the scene by checking the electronic image outputted from said imager against a plurality of dictionary images each of which represents the specific object captured from a view point different from others;

a detecting instruction to detect the number of the specific objects existing in the scene based on search results of said searching instruction;

a specifying instruction to specify based on the search results of said searching instruction a timing of all of the specific objects equivalent to the number detected by said detecting instruction facing a common direction; and a recording instruction to record the electronic image outputted from said imager at the timing specified by said specifying instruction.

9. An imaging control method executed by an electronic camera provided with an imager which outputs an electronic image produced on an imaging surface capturing a scene, the imaging control method comprising:

a searching step of repeatedly searching for a specific object from the scene by checking the electronic image outputted from said imager against a plurality of dictionary images each of which represents the specific object captured from a view point different from others;

a detecting step of detecting the number of the specific objects existing in the scene based on search results of said searching step;

a specifying step of specifying based on the search results of said searching step a timing of all of the specific objects equivalent to the number detected by said detecting step facing a common direction; and a recording step of recording the electronic image outputted from said imager at the timing specified by said specifying step.

* * * * *